US011096082B2

(12) United States Patent
Youn et al.

(10) Patent No.: US 11,096,082 B2
(45) Date of Patent: Aug. 17, 2021

(54) METHOD FOR MANAGING UPLINK QUALITY OF SERVICE AND BASE STATION FOR PERFORMING SAME METHOD

(71) Applicant: LG Electronics Inc., Seoul (KR)

(72) Inventors: Myungjune Youn, Seoul (KR); Hyunsook Kim, Seoul (KR); Jinsook Ryu, Seoul (KR); Heejeong Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/614,560

(22) PCT Filed: May 29, 2018

(86) PCT No.: PCT/KR2018/006108
§ 371 (c)(1),
(2) Date: Nov. 18, 2019

(87) PCT Pub. No.: WO2018/221942
PCT Pub. Date: Dec. 6, 2018

(65) Prior Publication Data
US 2020/0178112 A1   Jun. 4, 2020

Related U.S. Application Data

(60) Provisional application No. 62/512,170, filed on May 29, 2017.

(51) Int. Cl.
*H04W 28/02* (2009.01)

(52) U.S. Cl.
CPC ... *H04W 28/0268* (2013.01); *H04W 28/0263* (2013.01)

(58) Field of Classification Search
CPC ......... H04W 28/0263; H04W 28/0268; H04W 88/08; H04W 8/02; H04W 28/02
See application file for complete search history.

(56) References Cited

U.S. PATENT DOCUMENTS 9,444,683 B2   9/2016   Kakadia et al.
9,596,697 B2   3/2017   Tapia et al.
(Continued)

FOREIGN PATENT DOCUMENTS

WO   WO2013141625   9/2013
WO   WO2017074495   5/2017

OTHER PUBLICATIONS

Huawei et al: "Discussion on reflective QoS deactivation and modification" 3GPP Draft; S2-173481 Discussion on Reflective QoS Deactivation and Modification, Retrieved from the Internet: URL:http://www.3gpp.org/ftp/Meetings_3GPP_SYNC/SA2/Docs/ (Year: 2017).*

(Continued)

*Primary Examiner* — Nathan S Taylor
(74) *Attorney, Agent, or Firm* — Fish & Richardson P.C.

(57) ABSTRACT

A disclosure of the present specification provides a method for managing uplink quality of service (QoS) by a base station. The method may comprise the steps of: determining whether a timer, driven by a terminal in relation to reflective QoS, has expired; during driving of the timer of the terminal, transmitting multiple packets within a traffic flow, to which the reflective QoS is applied, without setting at least one of a reflective QoS indication (RQI) and a QoS flow ID (QFI) for the multiple packets therewithin; and before expiration of the timer being driven by the terminal, setting at least one of the RQI and the QFI for at least one packet within the traffic flow and transmitting the set packet.

17 Claims, 22 Drawing Sheets

(56) References Cited

U.S. PATENT DOCUMENTS

| | | | |
|---|---|---|---|
| 2016/0057649 A1 | 2/2016 | Kakadia et al. | |
| 2018/0234876 A1* | 8/2018 | Jheng | H04L 47/2441 |
| 2018/0352483 A1* | 12/2018 | Youn | H04W 76/18 |
| 2019/0327635 A1* | 10/2019 | Wei | H04W 28/0268 |
| 2019/0394830 A1* | 12/2019 | Mildh | H04W 52/0258 |
| 2020/0112874 A1* | 4/2020 | Jheng | H04W 28/26 |
| 2020/0267753 A1* | 8/2020 | Adjakple | H04W 72/1226 |
| 2020/0275302 A1* | 8/2020 | Youn | H04W 28/0268 |

OTHER PUBLICATIONS

Mediatek Inc: "pCR 23.501 Deactivation of UE-derived QoS rules for Reflective QoS", 3GPP Draft; S2-173147 PCR Reflective QoS Deactivation, May 2017 (May 14, 2017); Retrieved from the Internet: URL:http://www.3gpp.org/ftp/Meetings_3GPP_SYNC/SA2/Docs/ (Year: 2017).*

LG Electronics et al: "TS 23.501: Deactivation of the derived QoS rule", 3GPP Draft; S2-172362_TS 23 501 Deactivation of Derived Qos R7 Mar. 2017 (Mar. 29, 2017), XP051248058, Retrieved from the Internet: URL:http://www.3gpp.org/ftp/Meetings_3GPP_SYNC/SA2/Docs/ (Year: 2017).*

Intel: "23.501: Corrections to Reflective QoS", 3GPP Draft; S2-173342_23501_RQOS, May 14, 2017 (May 14, 2017), XP051281837, Retrieved from the Internet: URL:http://www.3gpp.org/ftp/Meetings_3GPP_SYNC/SA2/Docs/ (Year: 2017).*

\* cited by examiner

METHOD FOR MANAGING UPLINK QUALITY OF SERVICE AND BASE STATION FOR PERFORMING SAME METHOD

CROSS-REFERENCE TO RELATED APPLICATIONS

This application is a National Stage application under 35 U.S.C. § 371 of International Application No. PCT/KR2018/006108, filed on May 29, 2018, which claims the benefit of U.S. Provisional Application No. 62/512,170, filed on May 29, 2017. The disclosures of the prior applications are incorporated by reference in their entirety.

BACKGROUND

Field of the Disclosure

The present disclosure relates to a method for managing uplink quality of service (QoS) by a base station.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |

TABLE 1-continued

| REFERENCE POINT | DESCRIPTION |
|---|---|
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

<Next Generation Mobile Communication Network>

Thanks to the success of LTE (Long Term Evolution) and LTE-Advanced (LTE-A) for 4G mobile communication, interest in the next generation, namely 5G mobile communication increases and thus study on the 5G mobile communication is progressing.

The 5th generation mobile telecommunications defined by the International Telecommunication Union (ITU) refers to communication providing a data transmission rate of up to 20 Gbps and an actual minimum transmission rate of at least 100 Mbps anywhere. The official name of the 5th generation mobile telecommunications is 'IMT-2020' and ITU's goal is to commercialize the 'IMT-2020' worldwide by 2020.

The ITU proposes three usage scenarios, for example, enhanced Mobile Broadband (eMBB), massive Machine Type Communication (mMTC) and Ultra Reliable and Low Latency Communications (URLLC).

First, the URLLC relates to a usage scenario requiring high reliability and low latency. For example, services such as automatic driving, factory automation, augmented reality require high reliability and low latency (e.g., a delay time of less than 1 ms). The delay time of current 4G (LTE) is statistically 21 to 43 ms (best 10%) and 33 to 75 ms (median). This is insufficient to support a service requiring a delay time of 1 ms or less.

Next, the eMBB usage scenario relates to a usage scenario requiring mobile ultra-wideband.

It seems difficult for this ultra-wideband high-speed service to be accommodated by the core network designed for legacy LTE/LTE-A.

Therefore, in the so-called fifth generation mobile communication, a redesign of the core network is urgently required.

FIG. 2 is an exemplary diagram illustrating a predicted structure of a next generation mobile communication in terms of a node.

Referring to FIG. 2, the UE is connected to a data network (DN) through a next generation RAN (Radio Access Network).

The Control Plane Function (CPF) node shown in FIG. 3 may perform all or a part of the MME (Mobility Management Entity) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the figure is a type of a gateway over which user data is transmitted and received. The UPF node may perform all or part of the user plane functions of the S-GW and the P-GW of the fourth generation mobile communication.

The PCF (Policy Control Function) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, like an HSS (Home Subscriber Server) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

FIG. 3a is an exemplary diagram illustrating an architecture for supporting a multiple PDU session through two data networks. FIG. 3b is an exemplary diagram illustrating an architecture for supporting a concurrent access through two data networks.

FIG. 3a illustrates an architecture that allows an UE to simultaneously access two data network using a multiple PDU session. Two SMFs may be selected for two different PDU sessions.

FIG. 3b illustrates an architecture that allows the UE to simultaneously access two data networks using one PDU session.

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instance alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

<Roaming in Next Generation Mobile Communication Network>

Meanwhile, there are two schemes for handling a signaling request from the UE in a situation where the UE roams in a visited network, for example, Visited Public Land Mobile Network (VPLMN). A local break out (LBO) being a first scheme handles a signaling request from the UE by a visited network. According to a Home Routing (HR) being a second scheme, the visited network transfers a signaling request from the UE to a home network of the UE.

FIG. 4a is an exemplary diagram illustrating an architecture to which the LBO scheme is applied during roaming. FIG. 4b is an exemplary diagram illustrating an architecture to which the HR scheme is applied during roaming.

As shown in FIG. 4a, in an architecture to which the LBO scheme is applied, user data are transferred to a data network in a VPLMN. To this end, a PCF in the VPLMN performs interaction with an AF in order to generate a PCC rule for a service in the VPLMN. A PCF node in the VPLMN creates a PCC rule based on a policy set inside according to a roaming convention with a Home Public Land Mobile Network (HPLMN) businessman.

As shown in FIG. 4b, in the architecture to which the HR schemes applied, data of the UE is transferred to a data network in the HPLMN.

<Data Bypass to Non-3GPP Network>

In the next generation mobile communication, the data of the UE may bypass to a non-3GPP network, for example, a Wireless Local Area Network (WLAN) or Wi-Fi.

FIG. 5a to FIG. 5f illustrate architectures for bypassing data to the non-3GPP network.

The Wireless Local Area Network (WLAN) or Wi-Fi is regarded as the untrusted non-3GPP network. In order to access the non-3GPP network to a core network, a Non-3GPP InterWorking Function (N3IWF) may be added.

Meanwhile, wireless communication guarantees a specific level of performance in data transmission by assigning a priority to an application program, a user, a data flow, or the like. This is called quality of service (QoS).

In this case, QoS for uplink (UL) may be implemented by reflecting QoS for downlink (DL). That is, a UE may be configured to transmit UL data with the same level as a QoS level for received DL data. Such a mechanism for managing and guaranteeing QoS is called a reflective QoS scheme.

There are two methods of controlling reflective QoS (RQ) defined currently. The methods include a method in which a user plane is used to perform transmission by setting a reflective QoS indicator (RQI) in a N3 tunnel header and a method in which a control plane is used to transmit a NAS signal to a UE.

In order to apply the RQ, the UE needs to know a QoS flow ID (QFI) of a DL packet. In this case, an additional resource shall be used in order for the RAN to transmit the QFI. Therefore, since a radio resource is consumed when the QFI is always transmitted, the QFI may be transmitted only for a QoS flow to which the RQ is applied, and when transmitting a packet corresponding to the QoS flow to which the reflective QoS is applied, a BS may know in advance a specific QoS flow to which reflective QoS is to be applied, and may transmit the packet by inserting the QFI into a service data adaptation protocol (SDAP) header.

Meanwhile, when the RQ is configured by using a user plane, a packet is transferred from a UPF to the BS by setting an RQI in an N3 header. Therefore, upon receiving the packet in which the RQI is set, the BS may perform transmitting by inserting the QFI into an SDAP header.

However, when the RQ is configured by using a control plane, the BS shall perform transmission by inserting the QFI into the SDAP header of all packets corresponding to a specific QFI indicated by a session management function, instead of performing transmission on a packet basis, which causes a problem in that a radio resource of the BS is wasted.

SUMMARY OF THE DISCLOSURE

A disclosure of the present specification provides a method of managing uplink quality of service (QoS) by a base station. The method may include: determining whether a timer driven by a terminal in relation to reflective QoS has expired; transmitting a plurality of packets within a traffic flow to which the reflective QoS is applied, without setting at least one of a reflective QoS indication (RQI) and a QoS flow ID (QFI) during the driving of the timer of the terminal; and setting at least one of the RQI and the QFI for at least one packet within the traffic flow and transmitting the set packet, before the timer driven by the terminal expires.

The method may further include receiving the traffic flow from a user plane function (UPF). The RQI may be set in all packets within the first traffic flow received from the UPF.

Even if the RQI is set in all packets within the traffic flow received from the UPF, the at least one packet transmitted to the terminal may be transmitted without setting at least one of the QFI and the RQI during the driving of the timer of the terminal.

The traffic flow including packets in which the RQI is set by the UPF may be indicated by a session management function (SMF).

The method may further include receiving information on the timer driven by the terminal during a packet data unit (PDU) session establishment procedure or a PDU session modification procedure.

A value of the timer may be configured on a PDU session basis.

The timer may be driven for every traffic flow.

The method may further include determining whether information on the timer driven by the terminal in relation to the reflective QoS has been received. If the information on the timer has not been received, whether the timer has expired may be determined based on a pre-configured value.

The method may further include determining whether information on the timer driven by the terminal in relation to the reflective QoS has been received, according to whether the terminal roams.

If the terminal is in a roaming state, the information on the timer may be received from a visited network node or a home network node.

Another disclosure of the present specification provides a base station for managing uplink QoS. The base station may include: a transceiver; and a processor controlling the transceiver. The processor may be configured to: determine whether a timer driven by a terminal in relation to reflective QoS has expired; transmit a plurality of packets within a traffic flow to which the reflective QoS is applied, without setting at least one of a reflective RQI and a QFI during the driving of the timer of the terminal; and set at least one of the RQI and the QFI for at least one packet within the traffic flow and transmitting the set packet, before the timer driven by the terminal expires.

According to a disclosure of the present specification, a load of a terminal operation can be decreased when reflective QoS is used in a mobile communication system.

Figure 1:
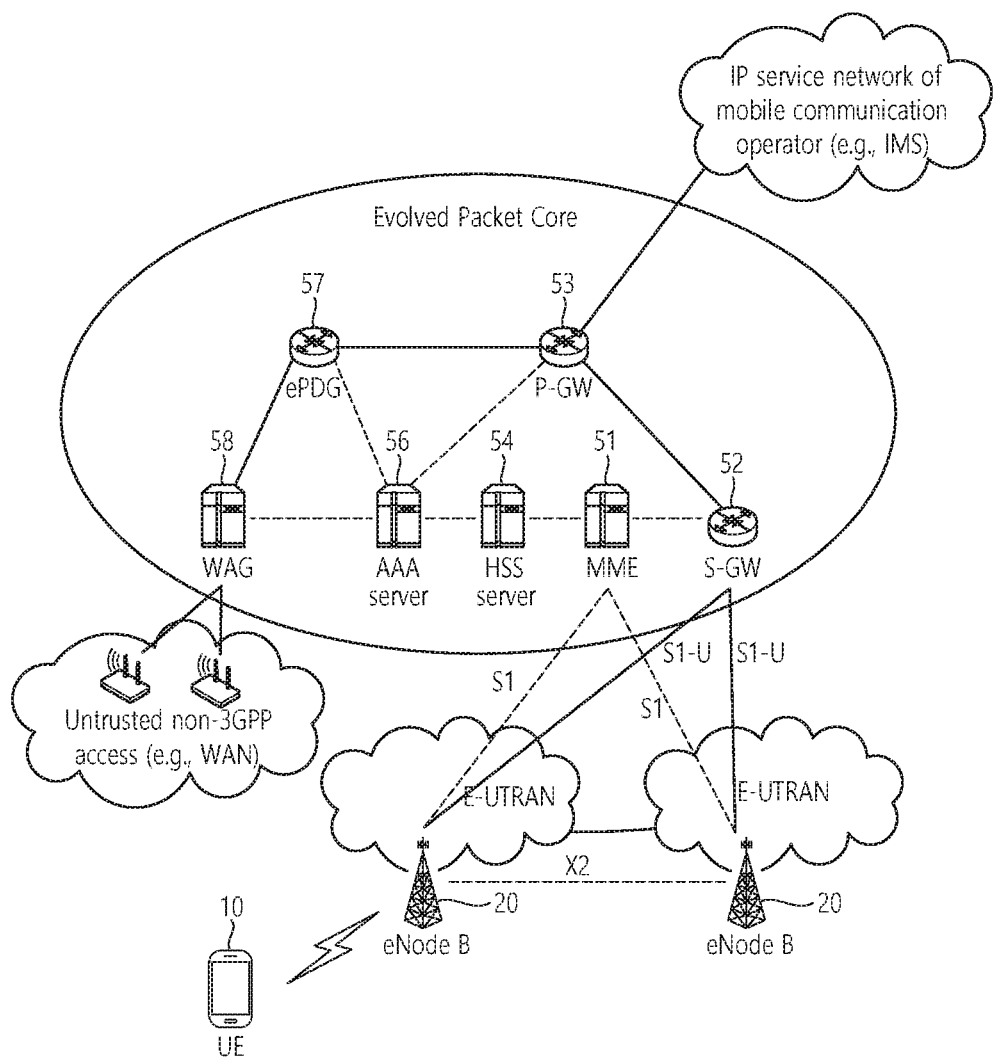
FIG. 1 shows the configuration of an evolved mobile communication network.
Figure 2:
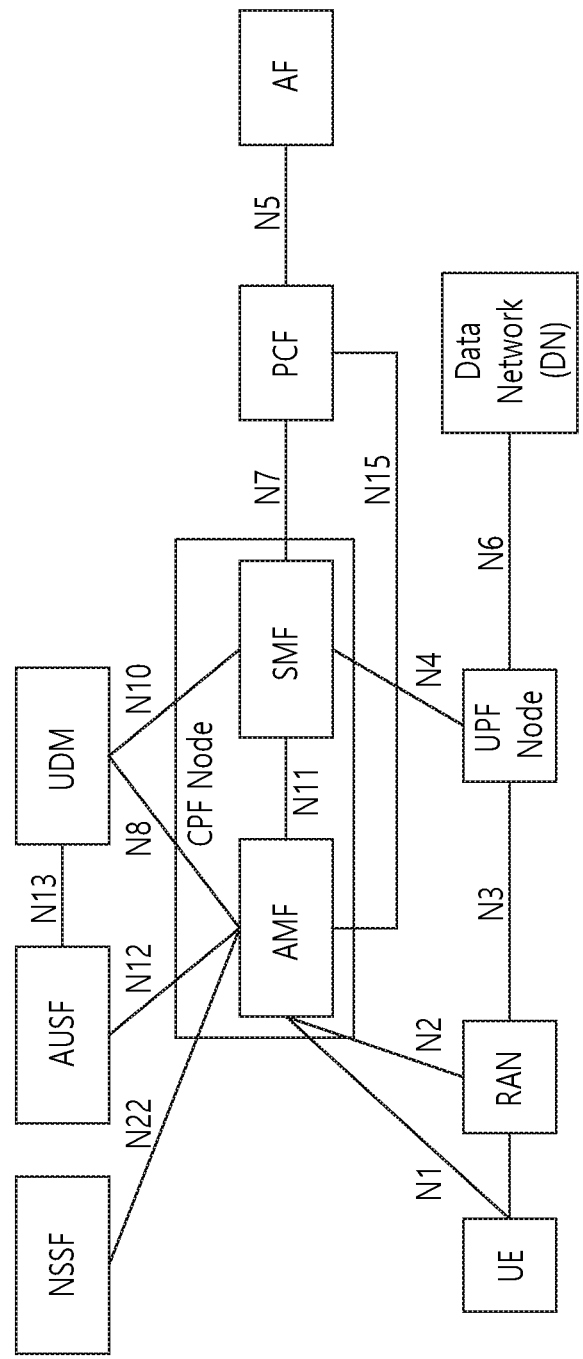
FIG. 2 is an exemplary diagram illustrating a predicted structure of a next generation mobile communication in terms of a node.
Figure 3A:
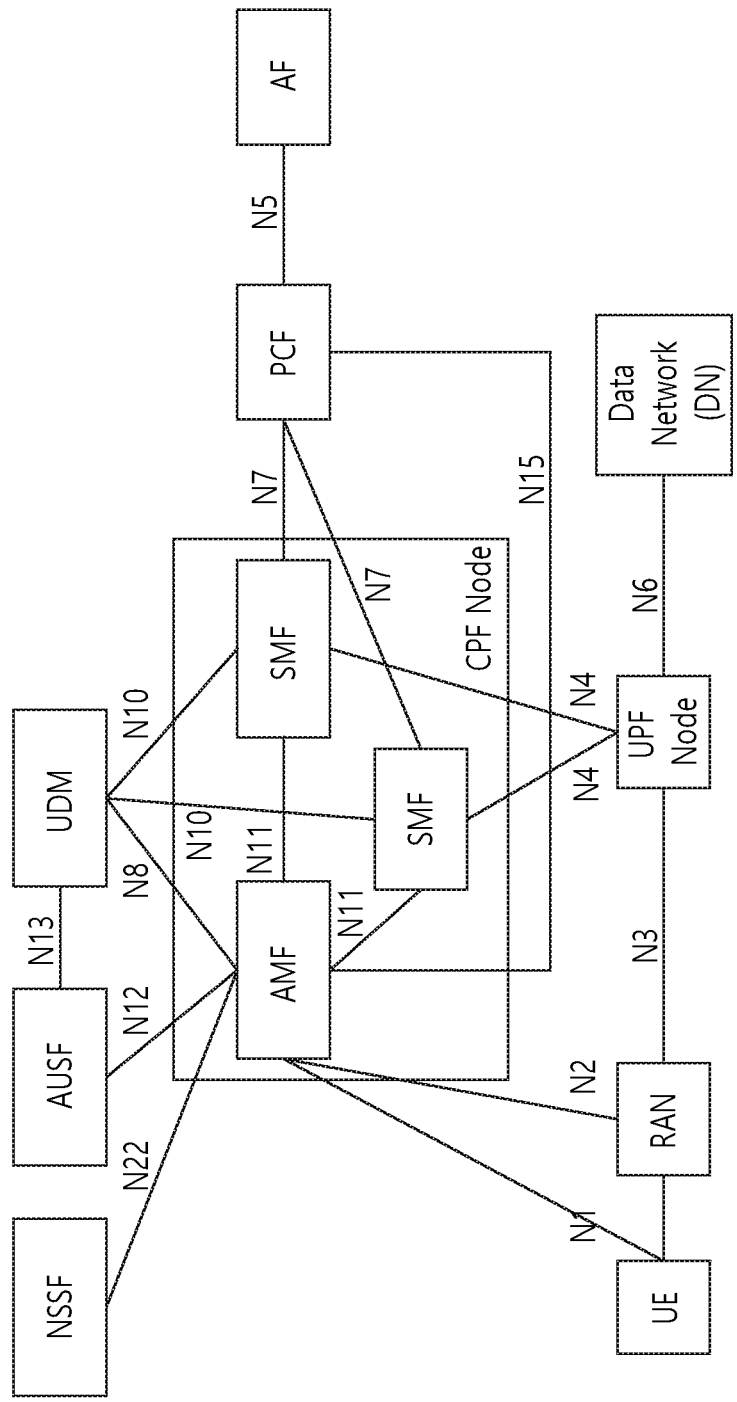
FIG. 3a is an exemplary diagram illustrating an architecture for supporting a multiple PDU session through two data networks.
Figure 3B:
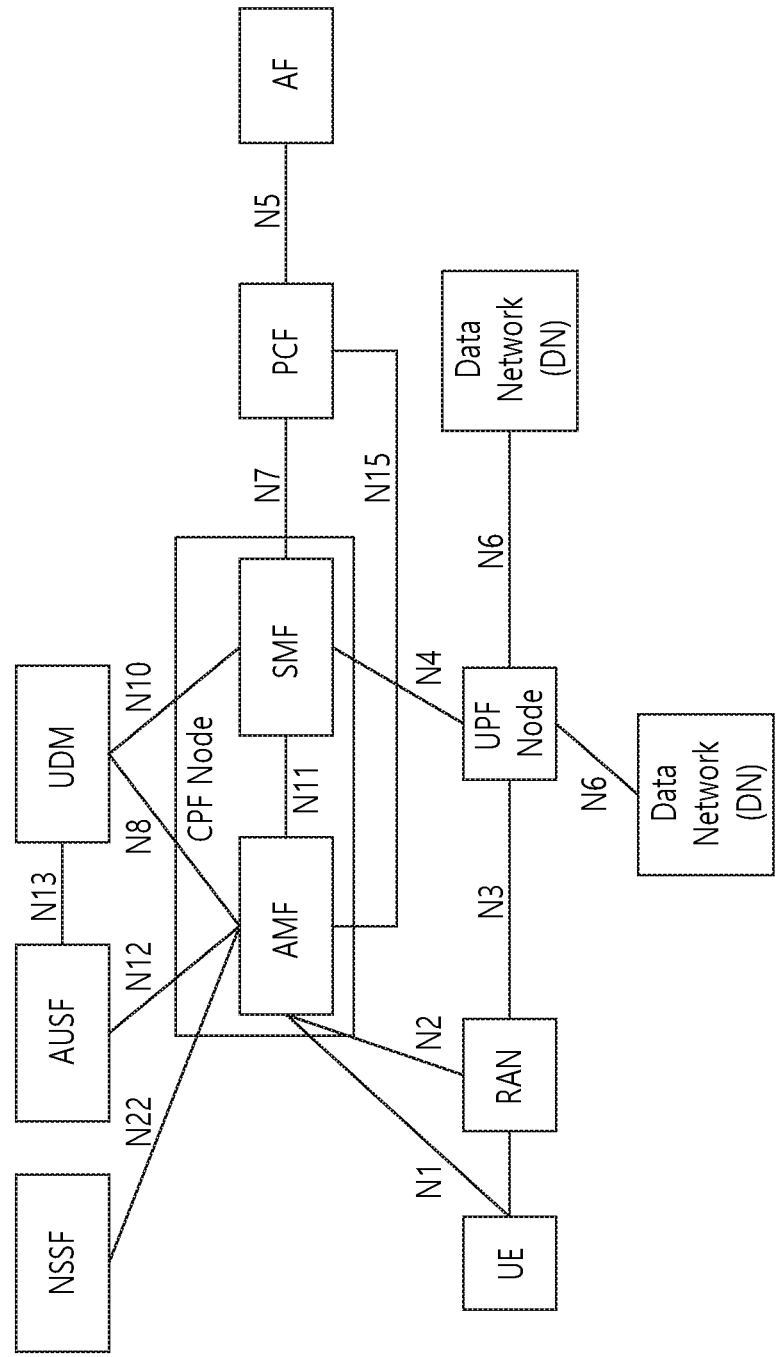
FIG. 3b is an exemplary diagram illustrating an architecture for supporting a concurrent access through two data networks.
Figure 4A:
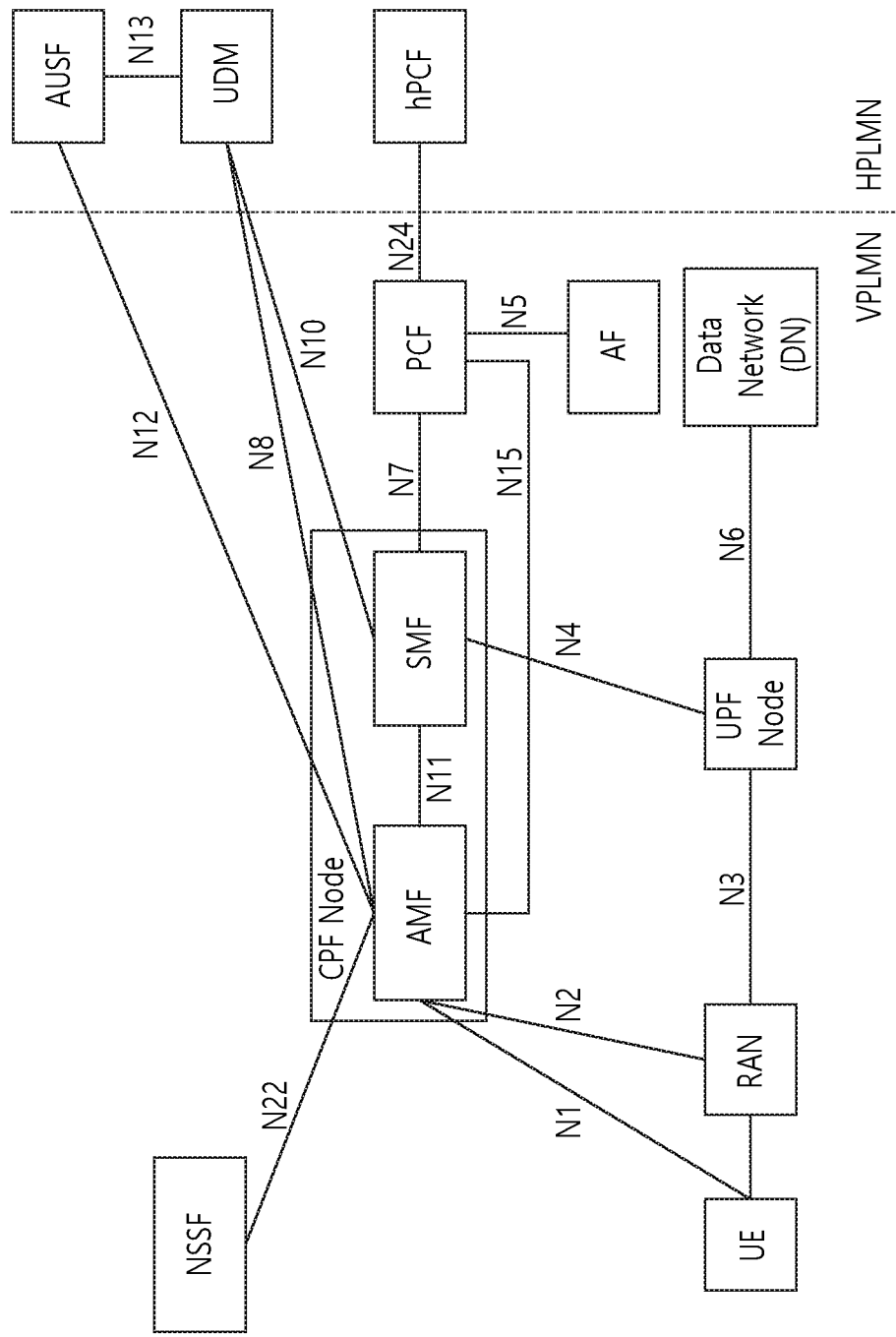
FIG. 4a is an exemplary diagram illustrating an architecture to which the LBO schemes applied during roaming.
Figure 4B:
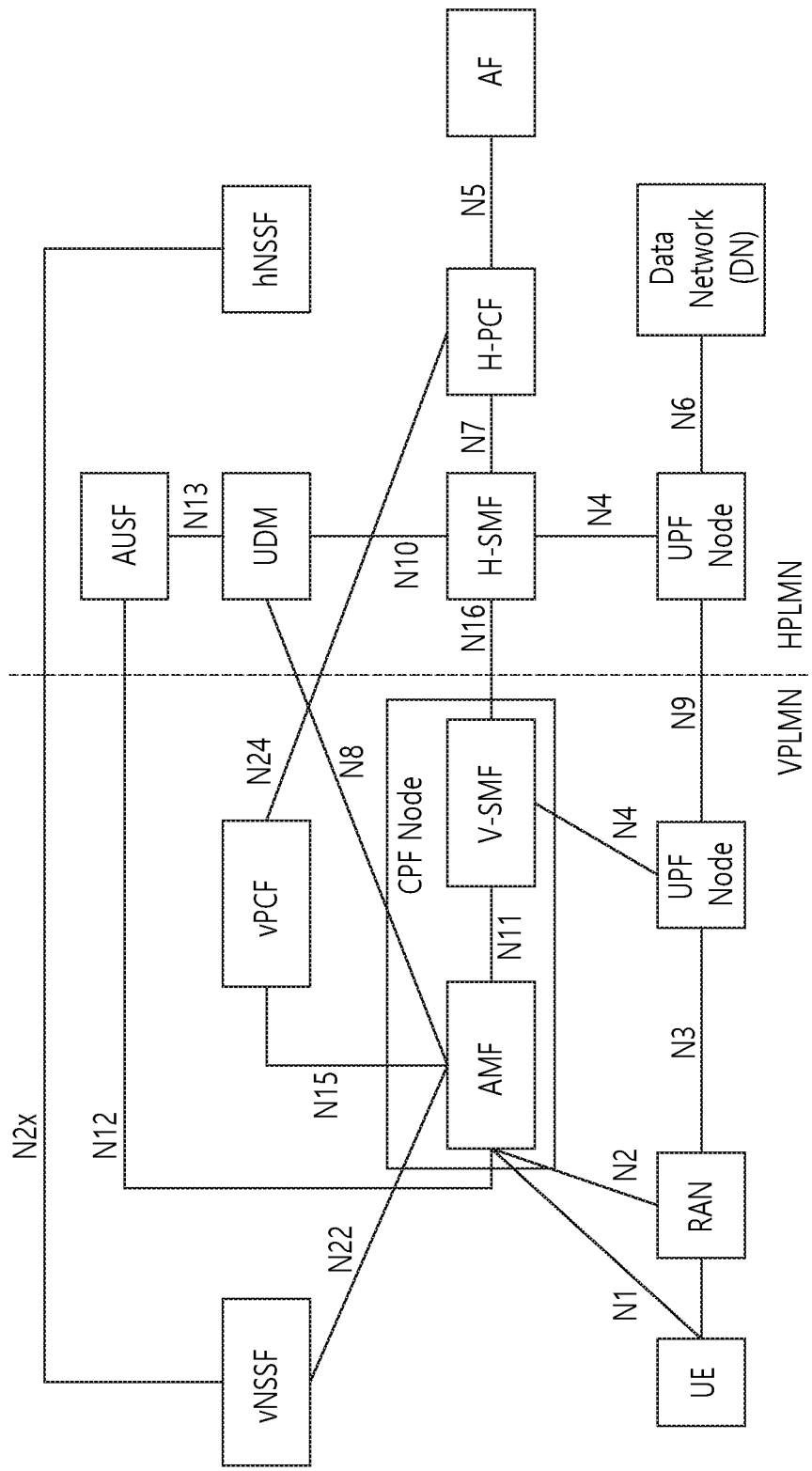
FIG. 4b is an exemplary diagram illustrating an architecture to which the HR schemes applied during roaming.
Figure 5A:
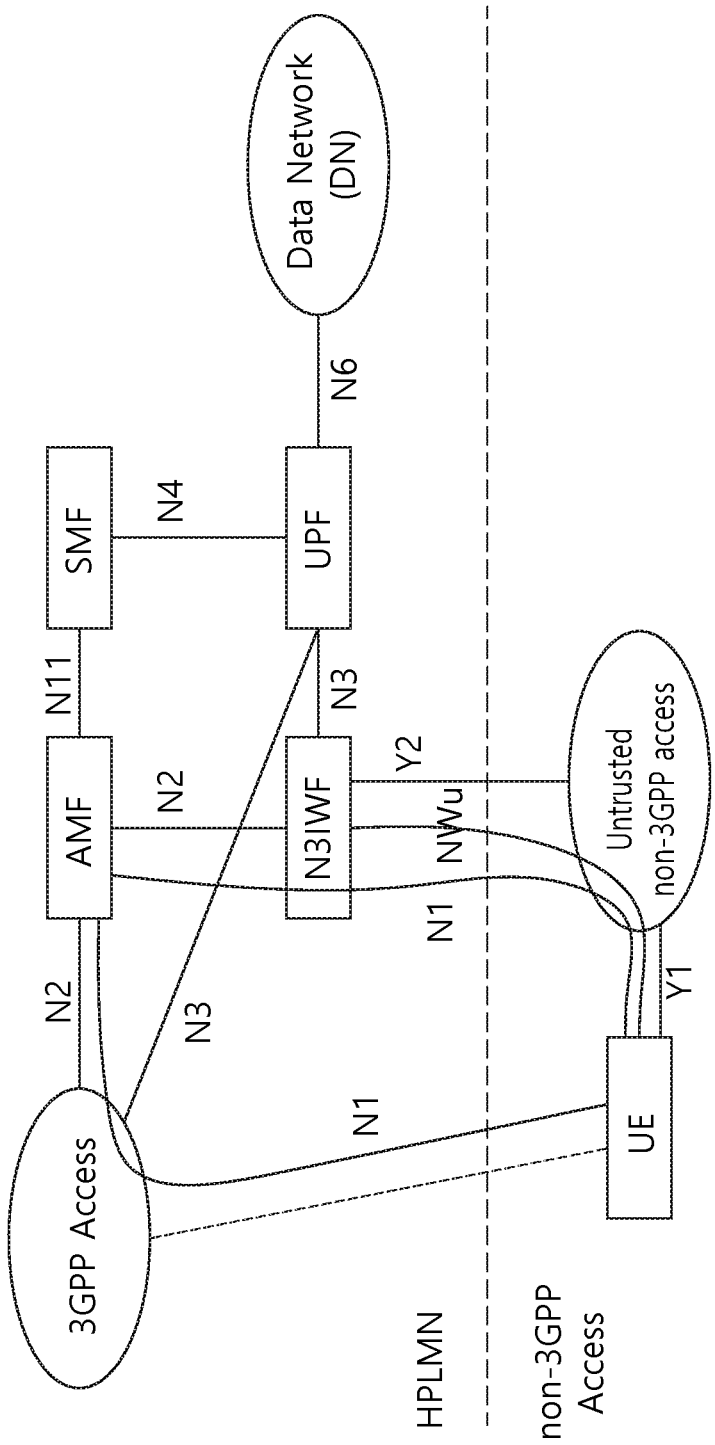
FIG. 5a to FIG. 5f illustrate architectures for bypassing data to the non-3GPP network.
Figure 5B:
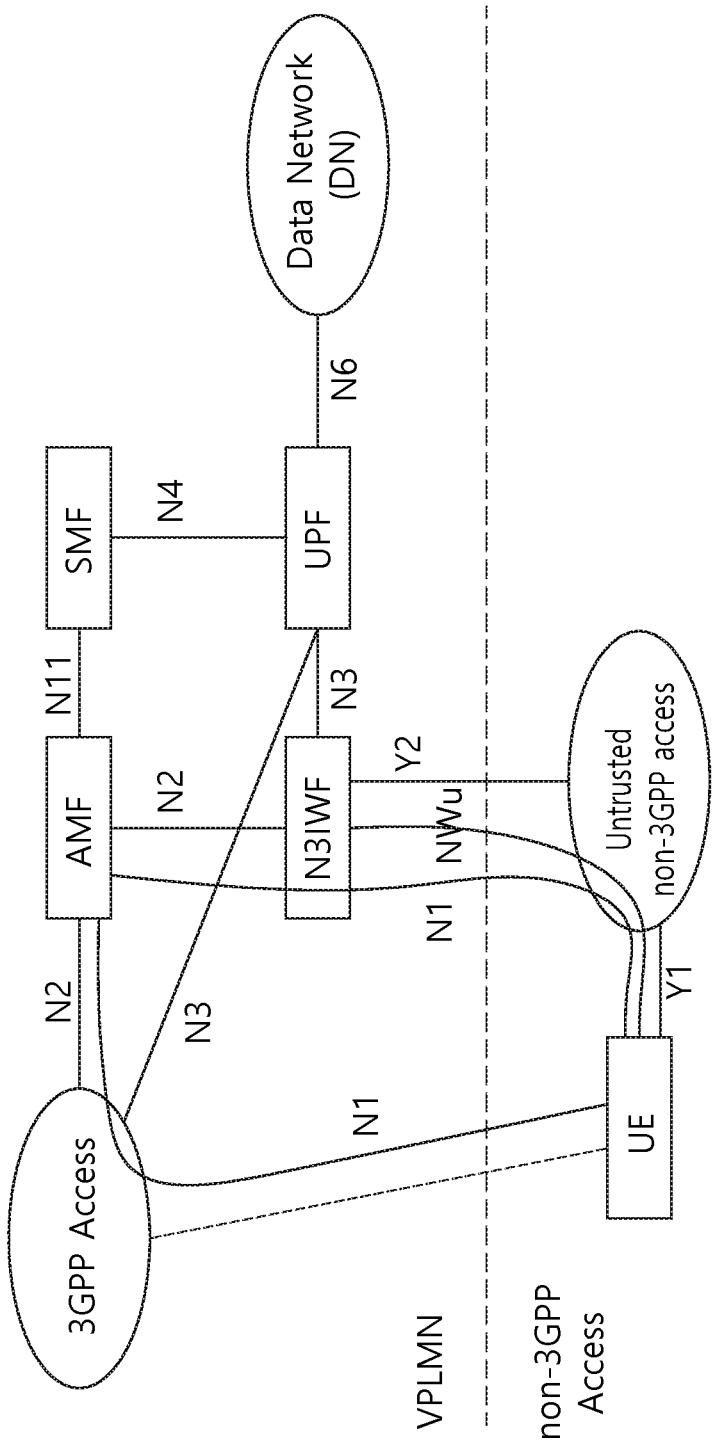
Figure 5C:
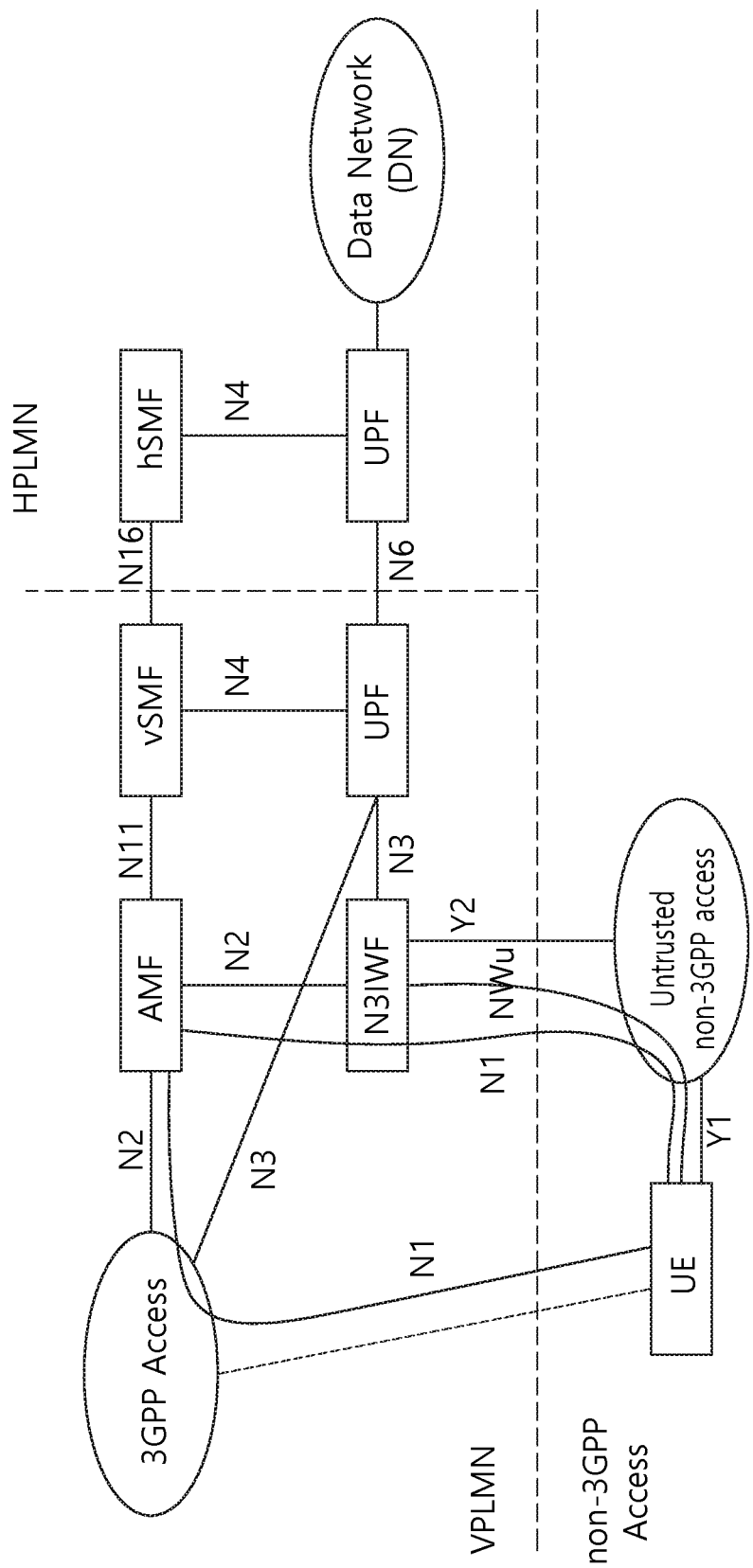
Figure 5D:
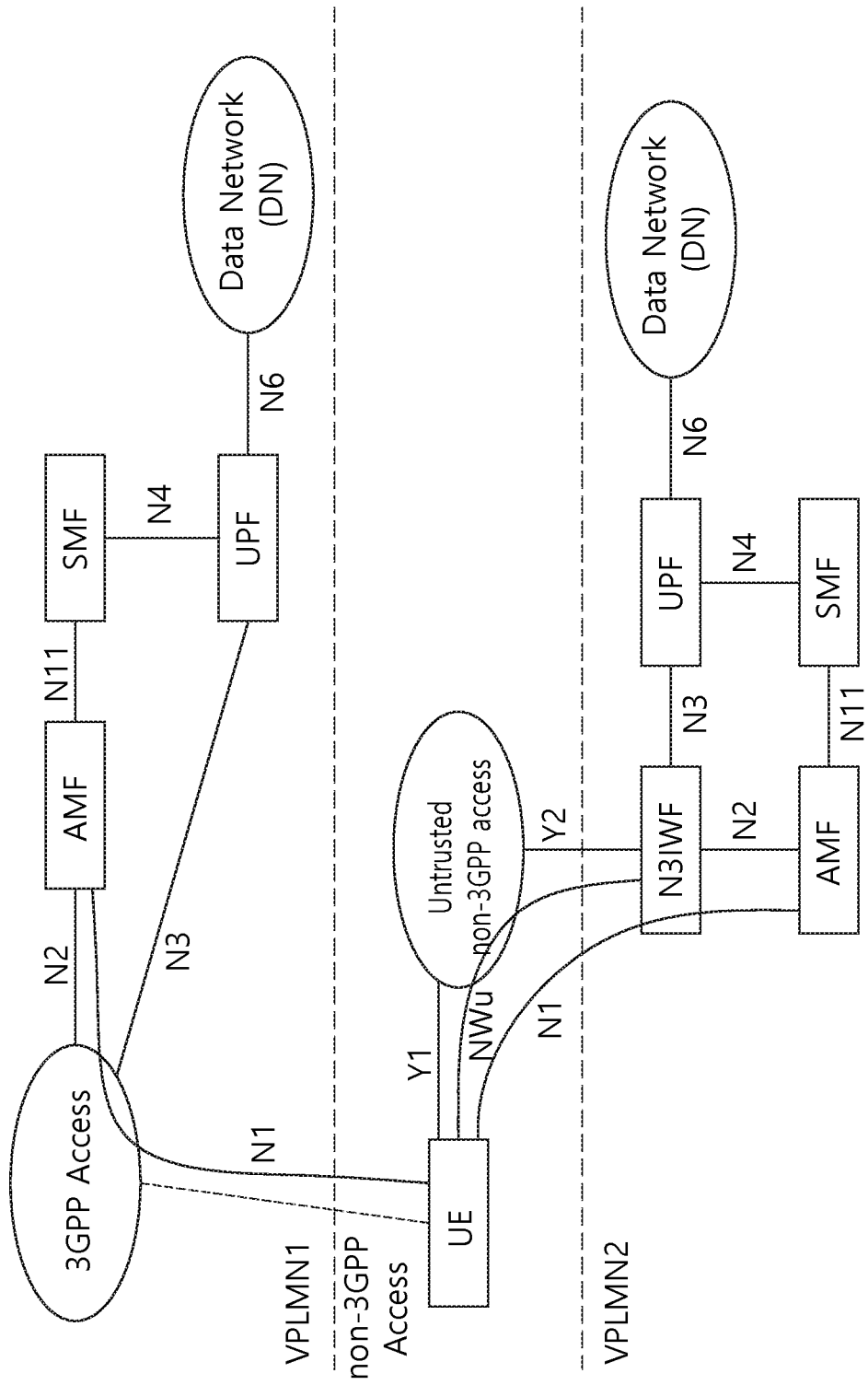
Figure 5E:
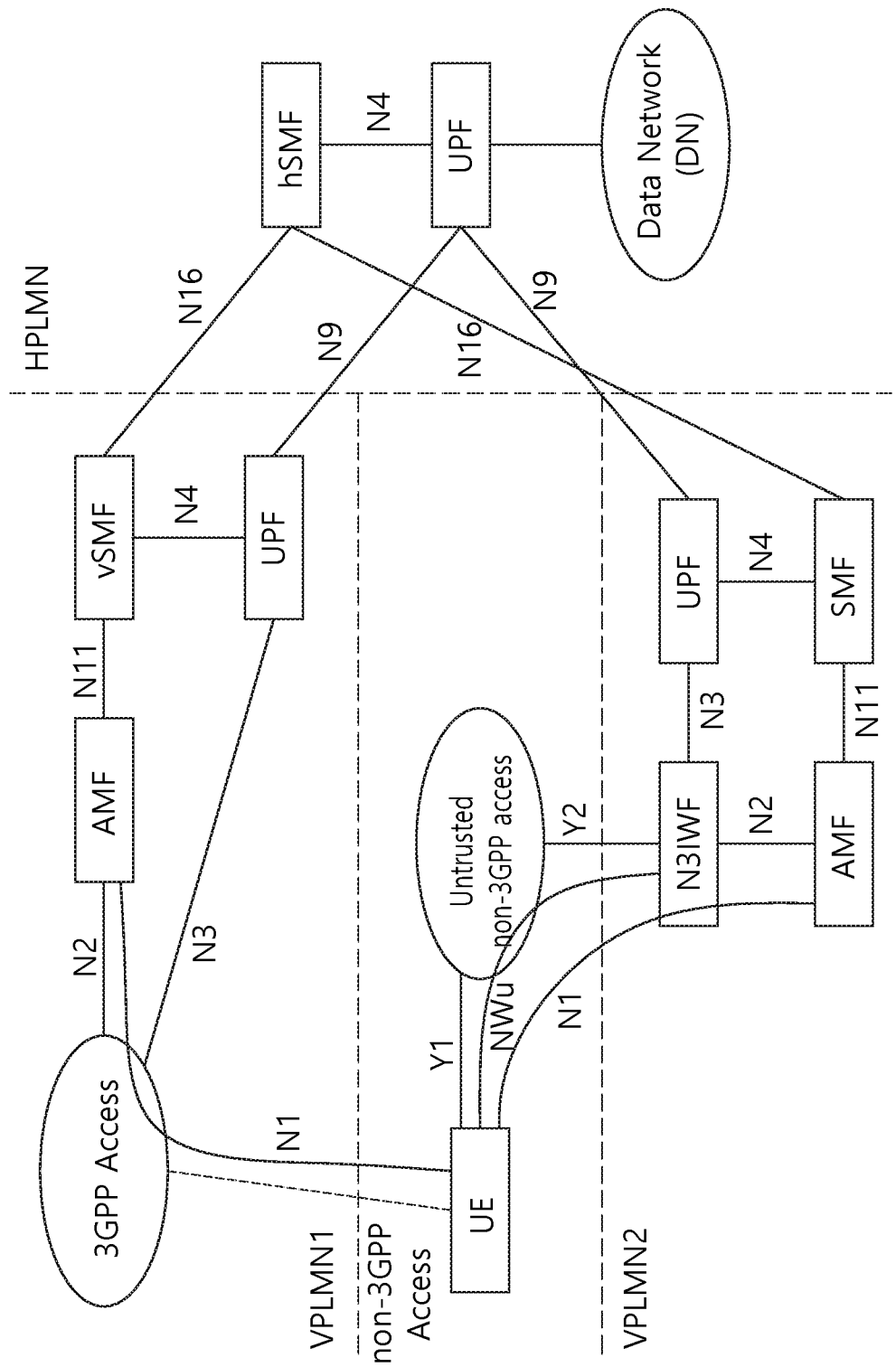
Figure 5F:
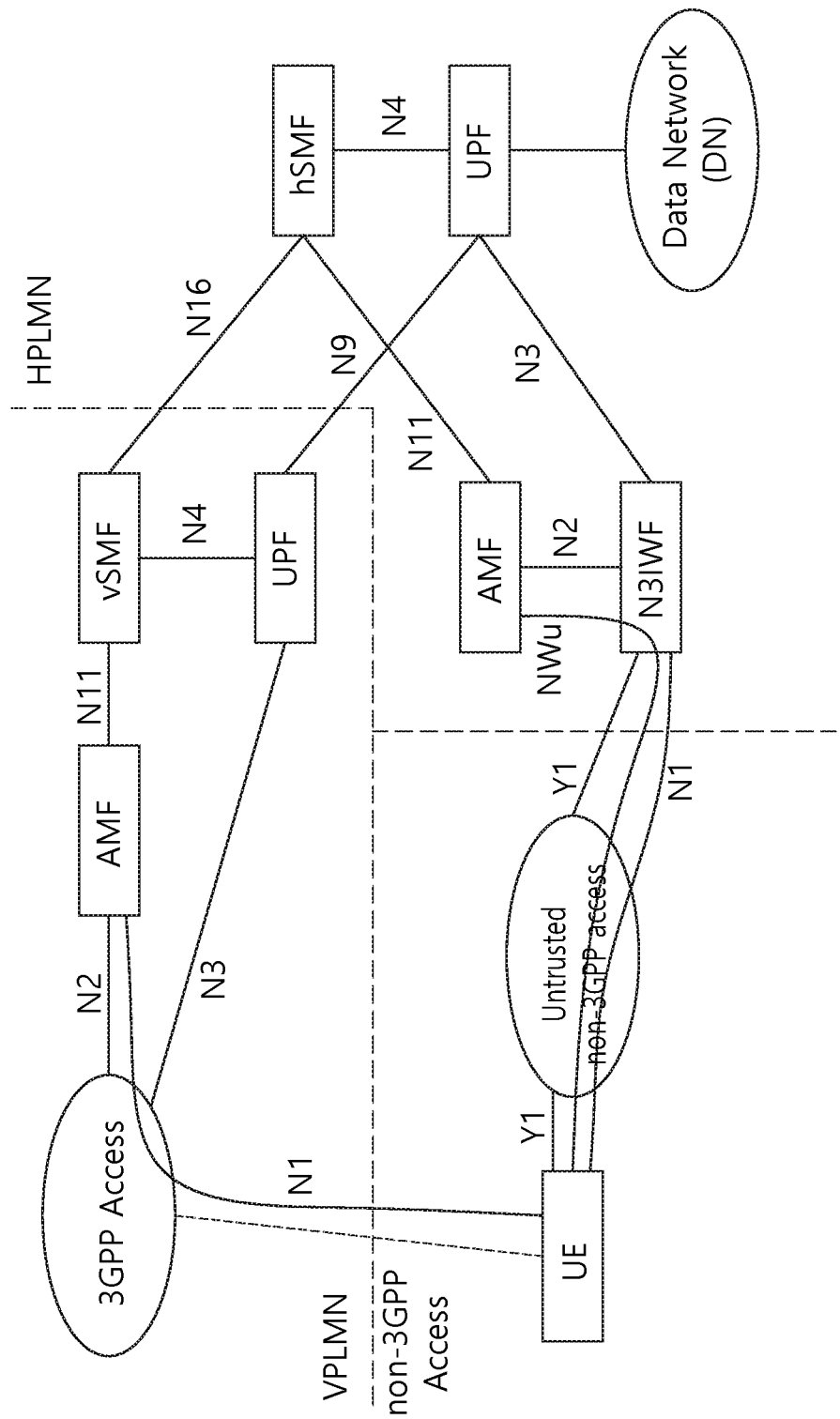

DESCRIPTION OF EXEMPLARY
EMBODIMENTS

The present disclosure is described in light of UMTS (Universal Mobile Telecommunication System) and EPC (Evolved Packet Core), but not limited to such communication systems, and may be rather applicable to all communication systems and methods to which the technical spirit of the present disclosure may apply. The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

<Registration Procedure>

The UE needs to obtain authorize to allow mobility tracking and data reception and to receive a service. To this end, the UE should register in the network. A registration procedure is performed when the UE needs to perform an initial registration with respect to a 5G system. Further, when the UE needs to perform a periodic registration update, to move a new tracking area (TA) in an idle mode, and to perform a periodic registration update, the registration procedure is performed.

During an initial registration procedure, an ID of the UE may be acquired from the UE. The AMF may transfer a PEI (IMEISV) to a UDM, an SMF, and a PCF.

Figure 6A:
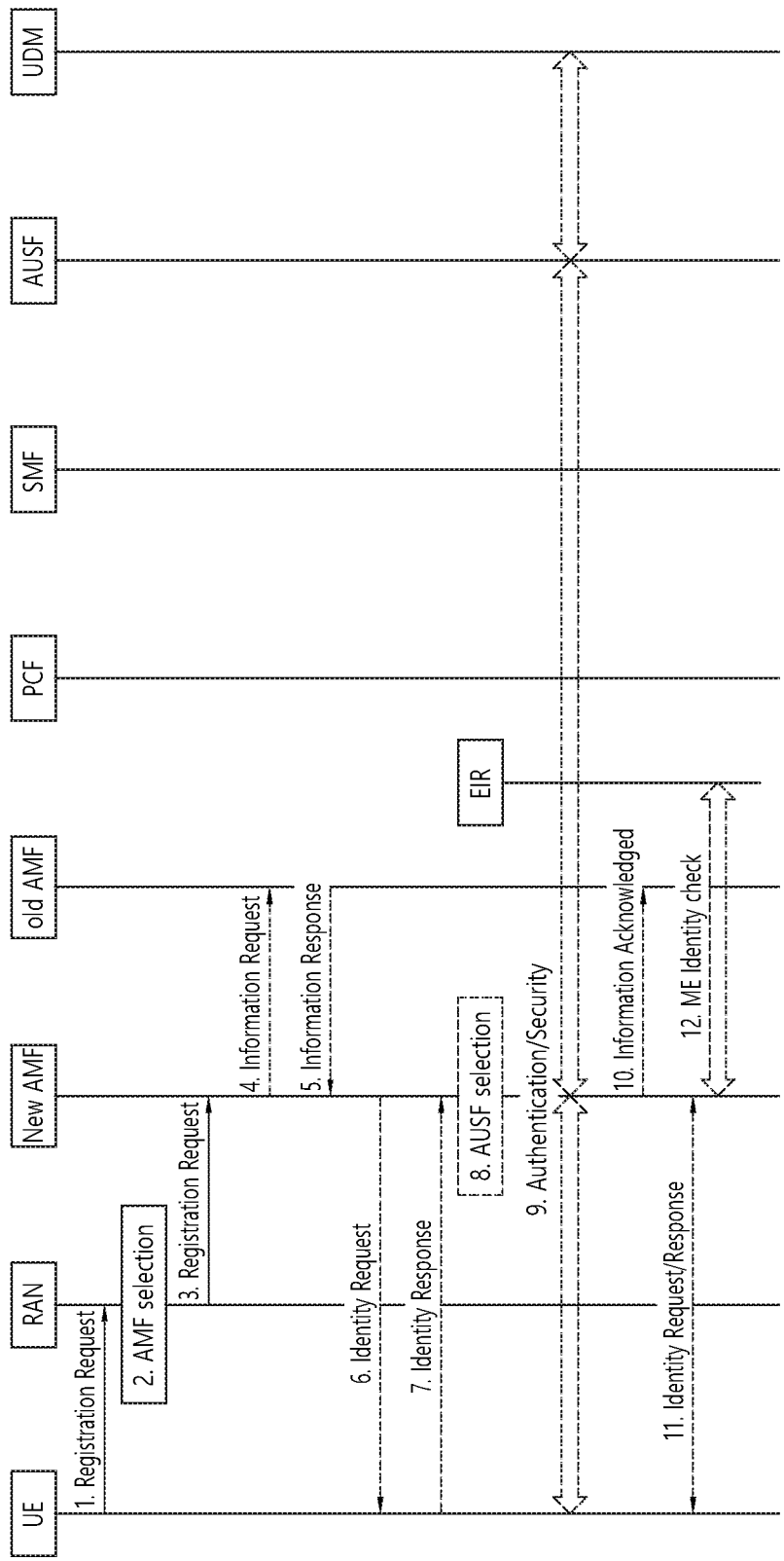
FIGS. 6a and 6b are flowcharts illustrating an exemplary registration procedure.
Figure 6B:
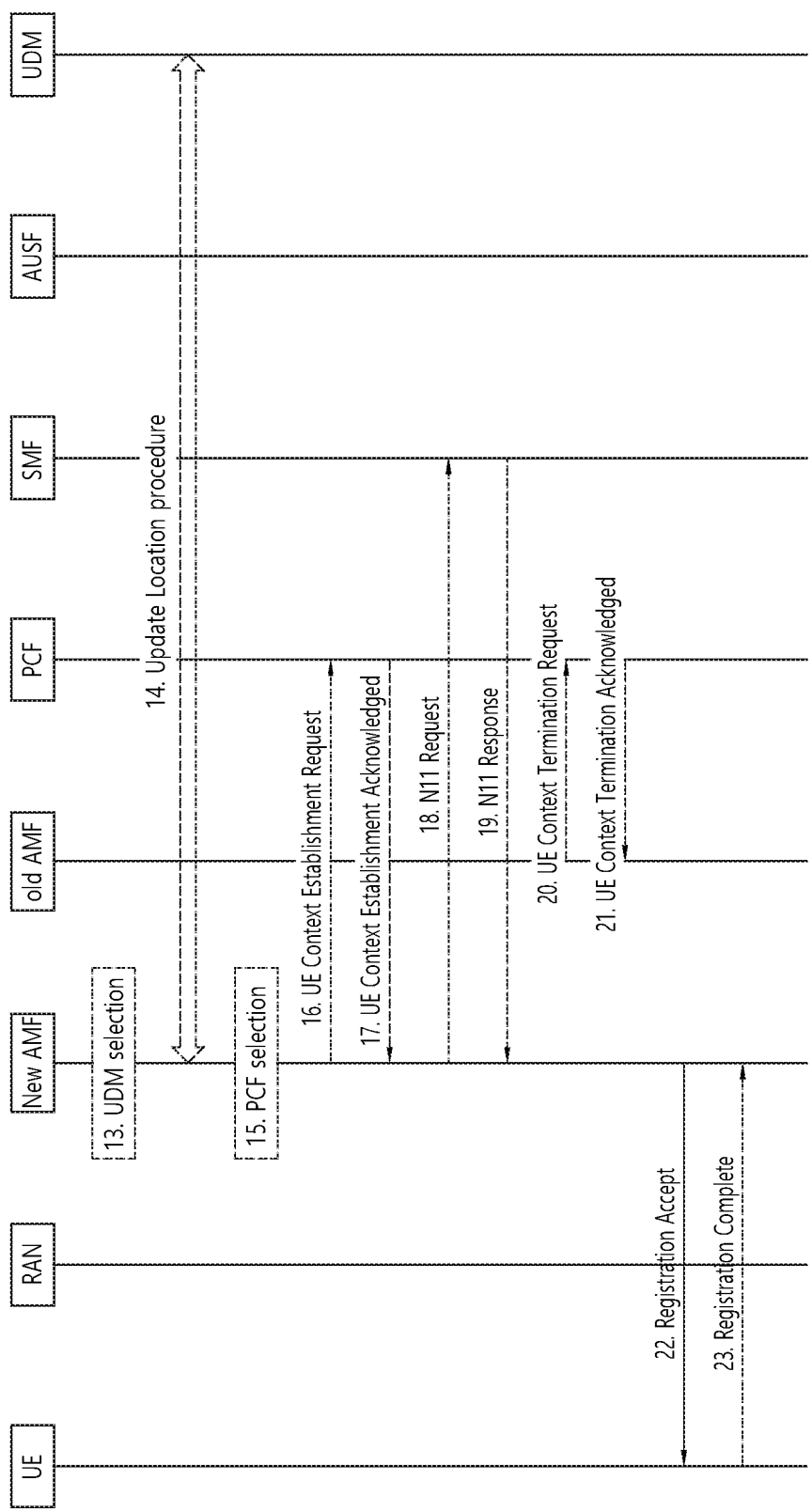

FIGS. 6a and 6b are a flowchart illustrating an exemplary registration procedure.

1) The UE may transmit an AN message to an RAN. The AN message may include AN parameters and a registration request message. The registration request message may include information such as a registration type, a subscriber permanent ID or a temporary user ID, a security parameter, an NSSAI, 5G ability of UE, PDU, and a PDU session state.

In a case of the 5G RAN, the AN parameter may include a SUPI or a temporary user ID, a selected network and an NSSAI.

The registration type may indicate whether UE is "initial registration" (that is, UE is in a non-registration state), "mobility registration update" (that is, UE is in a registered state to start the registration procedure due to mobility) or "regular registration update" (that is, UE is in a registered state to start the registration procedure due to periodic update timer expiration). When the temporary user ID is included, the temporary user ID indicates a final serving AMF. When the UE is previously registered through a non-3GPP access in a PLMN different from a PLMN of a 3GPP access, the UE may not provide an UE temporary ID assigned by an AMF during a registration procedure through a non-3GPP access.

The security parameter may be used for authentication and integrity protection.

The PDU session state represents a PDU session available (preset) in the UE.

2) When an SUPI is included or the temporary user ID does not represent a valid AMF, the RAN may select the AMF based on the (R)AT and the NSSAI.

When the (R)AN cannot select a suitable AMF, the UE selects a temporary AMF according to a local policy, and transfers a registration request to the selected AMF. When the selected AMF cannot serve the UE, the selected AMF selects another suitable AMF for UE.

3) The RAN transmits an N2 message to a new AMF. The N2 message includes an N2 parameter and a registration request. The registration request may include a registration type, a subscriber permanent identifier or a temporary use ID, a security parameter, an NSSAI, and an MICO mode basic setting.

When the 5G-RAN is used, the N2 parameter includes location information on a cell on which UE camps, cell identifier, and an RAT type.

If a registration type indicated by UE is periodic registration update, following procedures 4 to 17 may not be performed.

4) The newly selected AMF may transmit an information request message to a previous AMF.

When a temporary user ID of the UE is included in a registration request message and a serving AMF is changed after a final registration, the new AMF may transmit an information request message including complete registration request information to the previous AMF in order to request the SUPI and the MM context.

5) The previous AMF transmits an information response message to the newly selected AMF. The information response message may include the SUPI and the MM context, and SMF information.

In detail, the previous AMF transmits an information response message including the SUPI and MM context.

When the previous AM includes information on an active PDU session, the previous AMF may add SMF information including an ID and a PDU session ID of the SMF to the information response message.

6) When the SUPI is not provided by the UE or is not searched from the previous AMF, the new AMF transmit an Identity Request message to the UE.

7) The UE transmits an Identity Response message including the Identity Response to the new AMF.

8) The AMF may determine to trigger an AUSF. In this case, the AMF may select an AUSF based on the SUPI.

9) The AUSF may start authentication of the UE and NAS security function.

10) The new AMF may transmit an information response message to the previous AMF.

If the AMF is changed, the new AMF may transmit the information response message in order to confirm transfer of a UE MM context.

If authentication/security procedure fails, a registration is rejected and the new AMF may transmit a rejection message to the previous AMF.

11) The new AMF may transmit an Identity Request message to the UE.

When a PEI is not provided by the UE or the PEI is not searched from the previous AMF, the AMF may transmit an Identity Request message in order to search the PEI.

12) The new AMF tests an ME identifier.

13) If a procedure 14 to be described later is performed, the new AMF selects a UDM based on the SUPI.

14) If an AMF is changed after final registration, a valid subscription context with respect to the UE is not included in the AMF, or the UE provides the SUPI which does not refer to a valid context, the new AMF starts an update location procedure. Alternatively, the UDM starts a cancel location with respect to a previous AMF, the new AMF may start an update location procedure. The previous AMF removes the MM context to notify to all possible SMF(s). The new AMF obtains AMF relation subscription data from the UDM to generate an MM context with respect to the UE.

When network slicing is used, the AMF acquires an NSSAI allowed based on the requested NSSAI, UE subscription and local policy. If it is not suitable to support an NSSAI in which the AMF is allowed, the registration request is again routed.

15) The new AMF may select a PCF based on the SUPI.

16) The new AMF transmit a UE Context Establishment Request message to the PCF. The AMF may request an operator policy with respect to the UE to the PCF.

17) The PCF transmits a UE Context Establishment Acknowledged message to the new AMF.

18) The new AMF transmits an N11.

In detail, if the AMF is changed, the new AMF notifies a new AMF serving the UE to each SMF. The AMF verifies a PDU session state from the UE as available SMF information. When the AMF is changed, available SMF information may be received from the previous AMF.

The new AMF may request to the SMF to release a network resource associated with a PDU session which is not activated in the UE.

19) The new AMF transmits a N11 response message to the SMF.

20) The previous AMF transmits a UE Context Termination Request message to the PCF.

When the previous AMF is previously requested so that a PDF PCF configures the UE context.

21) The PCF may transmit the UE Context Termination Request message to the previous AMF.

22) The new AMF transmits a registration accept message to the UE. The registration accept message may include a temporary user ID, a registration area, mobility limitation, a PDU session state, an NSSAI, a regular update timer and an allowed MICO mode.

When the AMF assigns a new temporary user ID, the temporary user ID may be further included in the registration accept message. When the mobility limitation is applied to the UE, information indicating the mobility limitation may be further included in the registration accept message. The AMF may add information indicating a PDU session state with respect to the UE to the registration accept message. The UE may remove a temporary internal resource associated with a PDU session which is not indicated as activation in the received PDU session state. If PDU session state information is included in a Registration Request, the AMF may add information indicating a PDU session state the UE to the registration accept message.

23) The UE transmits a registration complete message to the new AMF.

<PDU Session Establishment Procedure>

The PDU session establishment procedure may include two types of PDU session establishment procedures
 PDU session establishment procedure starting by UE
 PDU session establishment procedure starting by a network. To this end, the network may transmit a device trigger message to application(s) of the UE.

Figure 7A:
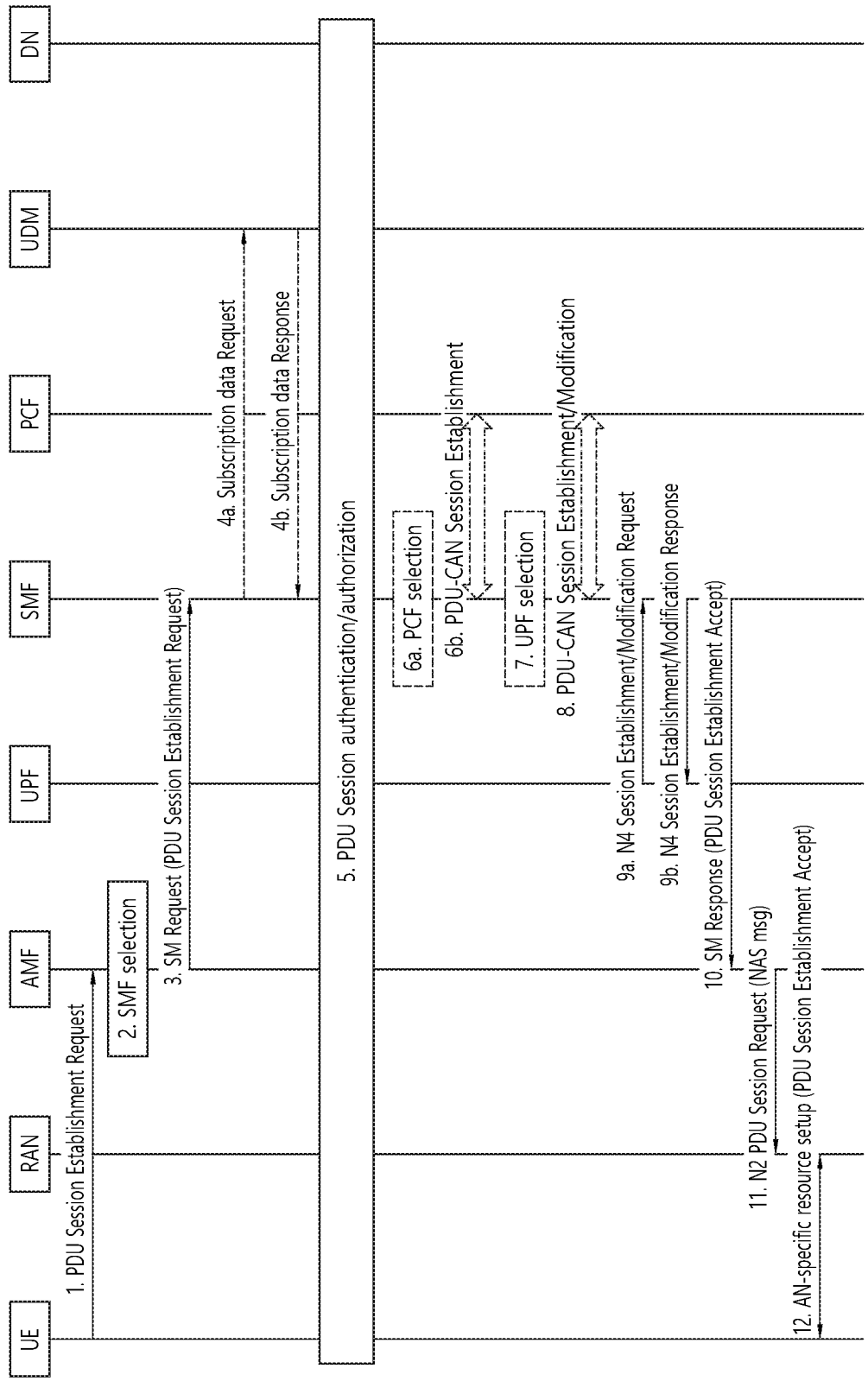
FIGS. 7a and 7b are flowcharts illustrating an exemplary PDU session establishment procedure.
Figure 7B:
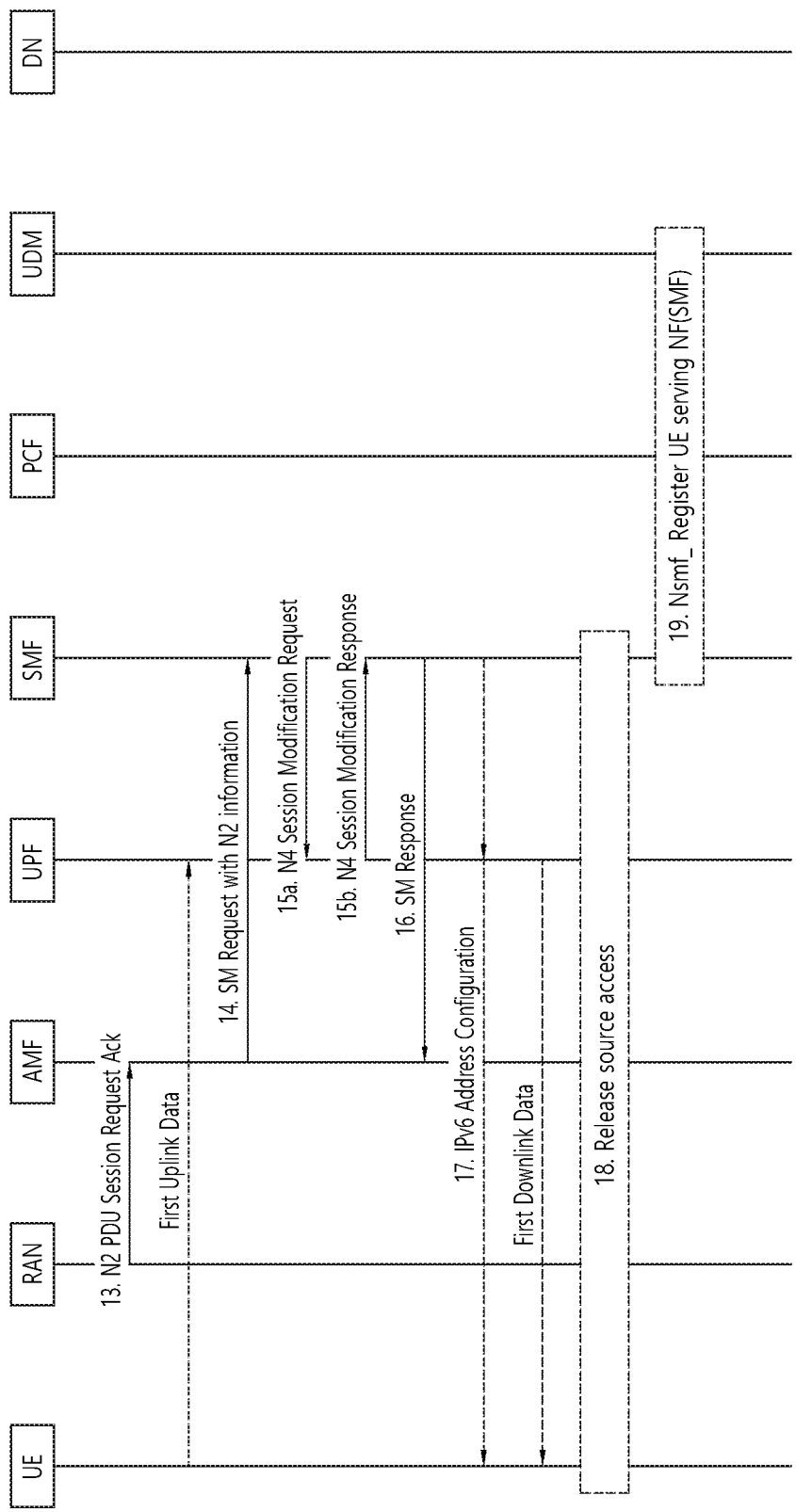

FIGS. 7a and 7b are a flowchart illustrating an exemplary PDU session establishment procedure.

It is assumed in a procedure shown in FIGS. 7a and 7b that the UE is previously registered on the AMF according to a registration procedure shown in FIGS. 6a and 6b. Accordingly, it is assumed that the AMF previously acquires user subscription data from the UDM.

1) The UE transmits an NAS message to the AMF. The message may include an S-NSSAI, a DNN, a PDU session ID, a request type, and N1 SM information.

In order to establish the new PDU session, the UE may create a new PDU session ID.

The UE may start a PDU session establishment procedure starting by the UE by transmitting an NAS message obtained by adding the PDU session establishment request message to N1 SM information. The PDU session establishment request message may include a request type, an SSC mode, and a protocol configuration option.

However, the PDU session establishment is to configure a new PDU session, a request type represents "initial request". However, when there is an existing PDU session between a 3GPP access and a non-3GPP access, the request type may represent "existing PDU session".

The NAS message transmitted by the UE is encapsulated in the N2 message by an AN. The N2 message is transmitted to the AMF, and may include user location information and access technology type information.
 N1 SM information may include SM PDU DN request container including information on PDU session authentication by external DN.

2) The AMF may determine that a message corresponding to a request with respect to a new PDU session when the request type indicates "initial request" and the PDU session ID is not sued for an existing PDU session of UE and the PDU session ID is not used for an existing PDU session of the UE.

If the NAS message does not include the S-NSSAI, the AMF may determine a default S-NSSAI with respect to a requested PDU session according to UE subscription. The AMF may store a PDU session ID and an ID of an SMF in connection with each other.

3) The AMF transmits an SM request message to the SMF. The SM request message may include a subscriber permanent ID, a DNN, an S-NSSAI, a PDU session ID, an AMF ID, N1 SM information, user location information, and an access technology type. The N1 SM information may include a PDU session ID and a PDU session establishment request message.

The AMF ID is used to identify an AMF serving the UE. The N1 SM information may include a PDU session establishment request message received from the UE.

4a) The SMF transmits a subscriber data request message to the UDM. The subscriber data request message may include a subscriber permanent ID and a DNN.

During the procedure 3, when the request type indicates "existing PDU session, the SMF determines that a corresponding request is caused between a 3GPP access and a non-3GPP access. The SMF may identify an existing PDU session based on a PDU session ID.

When the SMF does not search SM relation subscription data with respect to the UE associated with the DNN yet, the SMF may request subscription data.

4b) The UDM may transmit the subscription data response data to the SMF.

The subscription data may include information on an authenticated request type, an authenticated SSC mode, and a basic QoS profile.

The SMF may configure whether a UE request complies with user subscription and local policy. Alternatively, the SMF rejects a UE request through NAS SM signaling (including related SM rejection cause), and reports that the PDU session ID is regarded to be released to the AMF.

5) The SMF transmits a message to a DN through a UPF.

In detail, when the SMF approves/authenticates a PDU session establishment, the SMF selects a UPF to trigger a PDU.

When the PDU session establishment authentication/right grant fails, the SMF finishes the PDU session establishment procedure to report rejection to the UE.

6a) if a dynamic PCC is distributed, the SMF selects the PCF.

6b) The SMF may start a PDU-CAN session establishment in a direction of the PCF in order to obtain a basic PCC rule with respect to a PDU session. If the request type during the procedure 3 represents the "existing PDU session", the PCF may start PDU-CAN session modification.

7) If the request type during the procedure 3 represents the "initial request", the SMF selects an SSC mode with respect to the PDU session. If a procedure 5 is not performed, the SMF may also select the UPF. In a case of the request type IPv4 or IPv6, the SMF may assign IP address/prefix with respect to a PDU session.

8) When a dynamic PCC is disposed and a PDU-CAN session establishment is not terminated yet, the SMF may starts a PDU-CAN session.

9) When the request type represents the "initial request" and the procedure 5 is not performed, the SMF starts an N4 session establish procedure using a selected UPF. Otherwise, the SMF may start an N4 session modification procedure using a selected UPF.

9a) The SMF transmits an N4 session establishment/modification request message to the UPF. Further, the SMF may provide packet detection, enforcement and report rule to be installed at the UPF with respect to the PDU. When the CN tunnel information is assigned to the SMF, the CN tunnel information may be provided to the UPF.

9b) The UPF may respond by transmitting the N4 session establishment/modification response message. When the CN tunnel information is assigned by the UPF, the CN tunnel information may be provided to the SMF.

10) The SMF transmits the SM response message to the AMF. The SM response message may include a cause, N2 SM information, and N1 SM information. The N2 SM information may include a PDU session ID, a QoS profile, and CN tunnel information. The N1 SM information may include a PDU session establishment accept message. The PDU session establishment accept message may include an allowed QoS rule, an SSC mode, an S-NSSAI, and an assigned IPv4 address.

The N2 SM information is information where the AMF should transfer to the RAN, and may include the following information.

CN tunnel information: The CN tunnel information corresponds to a core network address of a N3 tunnel corresponding to the PDU session.

QoS profile: The QoS profile is used to provide mapping between a QoS parameter and a QoS flow identifier to the RAN.

PDU session ID: The PDU session ID may be used to indicate a relationship between AN resources with respect to the UE and the PDU session by AN signaling with respect to the UE.

Meanwhile, the N1 SM information includes a PDU session accept message to be provided to the UE from the AMF.

Multiple QoS rules may be included in N1 SM information and N2 SM information of the PDU session establishment accept message.

The SM response message include information to determine which access is used so that a PDU session ID and the AMF are used for a certain UE and the UE.

11) The AMF transmits an N2 PDU session request message to the RAN. The N2 PDU session request message may include N2 SM information and an NAS message. The NAS message may include a PDU session ID and a PDU session establishment accept message.

The AMF may transmit a NAS message including a PDU session ID and a PDU session establishment accept message. Further, the AMF adds the N2 SM information from the SMF to the N2 PDU session request message to transmit N2 PDU session request message the RAN.

12) The RAN may specific signal exchange with the UE associated with information received from the SMF.

Further, the RAN assigns RAN N3 tunnel information with respect the PDU session.

The RAN transfers the NAS message provided during the procedure 10 to the UE. The NAS message may include a PDU session ID and N1 SM information. The N1 SM information may include a PDU session establishment accept message.

When a necessary RAN resource is configured and the RAN tunnel information is successfully assigned, the RAN transmits the NAS message to the UE.

13) The RAN transmits the N2 PDU session response message to the AMF. The N2 PDU session response message may include a PDU session ID, a cause, and N2 SM information. The N2 SM information may include a PDU session ID, (AN) tunnel information, and an allowed/rejected QoS profile list.

RAN tunnel information may correspond to an access network address of a N3 tunnel corresponding to the PDU session.

14) The AMF may transmit an SM request message to the SMF. The SM request message may include N2 SM information. Here, the AMF may transfer the N2 SM information received from the RAN to the SMF.

15a) When an N4 session with respect to the PDU session is not previous configured, the SMF may start the N4 session establishment procedure together with the UPF. Otherwise, the SMF may start an N4 session modification procedure using the UPF. The SMF may provide AN tunnel information and CN tunnel information. The CN tunnel information may be provided only when the SMF selects the CN tunnel information during a procedure 8.

The UPF may transmit an N4 session establishment/modification response message to the SMF.

16) The SMF may transmit an SM response message to the AMF. If the above procedure is terminated, the AMF may transfer a related event to the SMF. When the RAN tunnel information is changed or upon handover in which the AMF is redisposed, the related event occurs.

17) The SMF transmits information to the UE through a UPF. In detail, in a case of the PDU Type IPv6, the SMF creates an IPv6 Router Advertisement to transmit the IPv6 Router Advertisement through the N4 and the UPF.

18) When the PDU session establishment request is caused due to handover between a 3GPP access and a non-3GPP access, that is, if the request type is set as a "existing PDU session", the SMF release a user plane through a source access (3GPP access or non-3GPP access).

19) When an ID of the SMF is not included during a procedure 4b by an UDM of a DNN subscription context, the SMF may include the SMF address and the DNN to call a "UDM_Register UE serving NF service". The UDM may store an ID and an address of the SMF, and a related DNN.

If the PDU session establishment fails during a procedure, the SMF reports the above to the AMF.

<Quality of Service (QoS)>

Wireless communication guarantees a specific level of performance in data transmission by assigning a priority to an application program, a user, a data flow, or the like. This is called quality of service (QoS).

A QoS model in a 5G system supports a framework based on a QoS flow. The QoS model in the 5G system supports both a QoS flow requiring a verified flow bit rate and a QoS flow not requiring the verified flow bit. The QoS model in the 5G system also supports reflective QoS.

The QoS flow is the most differentiated part of QoS in a PDU session. The QoS flow ID (QFI) is used to identify the QoS flow in the 5G system. User plane traffic having the same QFI in the PDU session receives the same traffic forwarding process (e.g., scheduling, grant threshold). The QFI may be transferred by being included in an encapsulation header of N3 (and N9). That is, the QFI may be transferred without having to change an e2e packet header. This may be applied to different types of payloads, i.e., IP packets, unstructured PDUs, and Ethernet frames. Only one QFI shall exist in the PDU session. Polishing of user plane traffic (e.g., applying of MFBR) is not regarded as QoS differentiation, and may be performed by a UPF according to a granularity of an SDF level.

Each QoS flow (GBR and non-GBR) may be determined by the following QoS parameters.

5G QoS indicator (5QI)

Allocation and retention priority (ARP)

A GBR QoS flow may be determined by the following additional QoS parameters.

Guaranteed flow bit rate (GFBR)—UL and DL

Maximum flow bit rate (MFBR)—UL and DL

Notification control

A non-GBR QoS flow may be determined by the following additional QoS parameters.

Reflective QoS attribute (RQA)

A method of controlling the QoS flow supports two cases.

In case of a non-GBR QoS flow having standardized 5QI, a 5QI value is used as a QFI, and a default ARP is used. In this case, additional N2 signaling is not necessary when traffic for a corresponding QoS flow starts.

In case of GBR and non-GBR QoS flows, all QoS parameters required for a QFI are transmitted to an (R)AN and/or a UPF as a QoS profile in a PDU session establishment procedure or a QoS flow establishment/modification procedure.

The QoS parameters of the QoS flow are provided as a QoS profile to the (R)AN through N2 in the PDU session or QoS flow establishment procedure and whenever a user plane is activated. In case of the non-GBR QoS flow, the QoS parameter may be pre-configured in the (R)AN. That is, in case of the non-GBR QoS flow, the QoS parameter is not necessarily signaled through N2.

A UE performs marking and classification of UL user plane traffic on the basis of the QoS rule. That is, the UE performs classification and marking of UL traffic related to the QoS flow on the basis of the QoS rule. The QoS rule may be signaled explicitly (in the PDU session establishment procedure or the QoS flow establishment procedure) through N1, or may be pre-configured in the UE, or may be obtained by the UE implicitly from reflective QoS. The QoS rule includes a QoS rule identifier, a QFI of a QoS flow, one or more packet filters, and a precedence value. One or more QoS rules may exist for the same QFI (i.e., the same QoS flow).

Every PDU session requires a default QoS rule. The default QoS rule may be a unique QoS rule in a PDU session not including a packet filter. In this case, a highest precedence value (e.g., a lowest priority) shall be used. If the default QoS rule does not include the packet filter, the default QoS rule may define handling of a packet which does not match any other QoS rules in the PDU session.

An SMF may allocate a QFI for every QoS flow, and the SMF may obtain a QoS parameter for the QFI from information provided by a PCF. If applicable, the SMF may transmit the QFI to an (R)AN together with the QoS profile including the QoS parameter of the QoS flow. The SMF may transmit an SDF template together with an SDF precedence and a corresponding QFI to a UPF capable of classifying and marking user plane traffic. Herein, the SDF template may be a set of packet filters related to the SDF received from the PCF. If applicable, the SMF may generate QoS rule(s) for a PDU session by allocating QoS rule identifier(s), adding a QFI of a QoS file, setting packet filter(s) in a UL part of the SDF template, and setting a QoS rule precedence to an SDF precedence. The QoS rule may be provided to a UE capable of classifying and marking UL user plane traffic.

Figure 8:
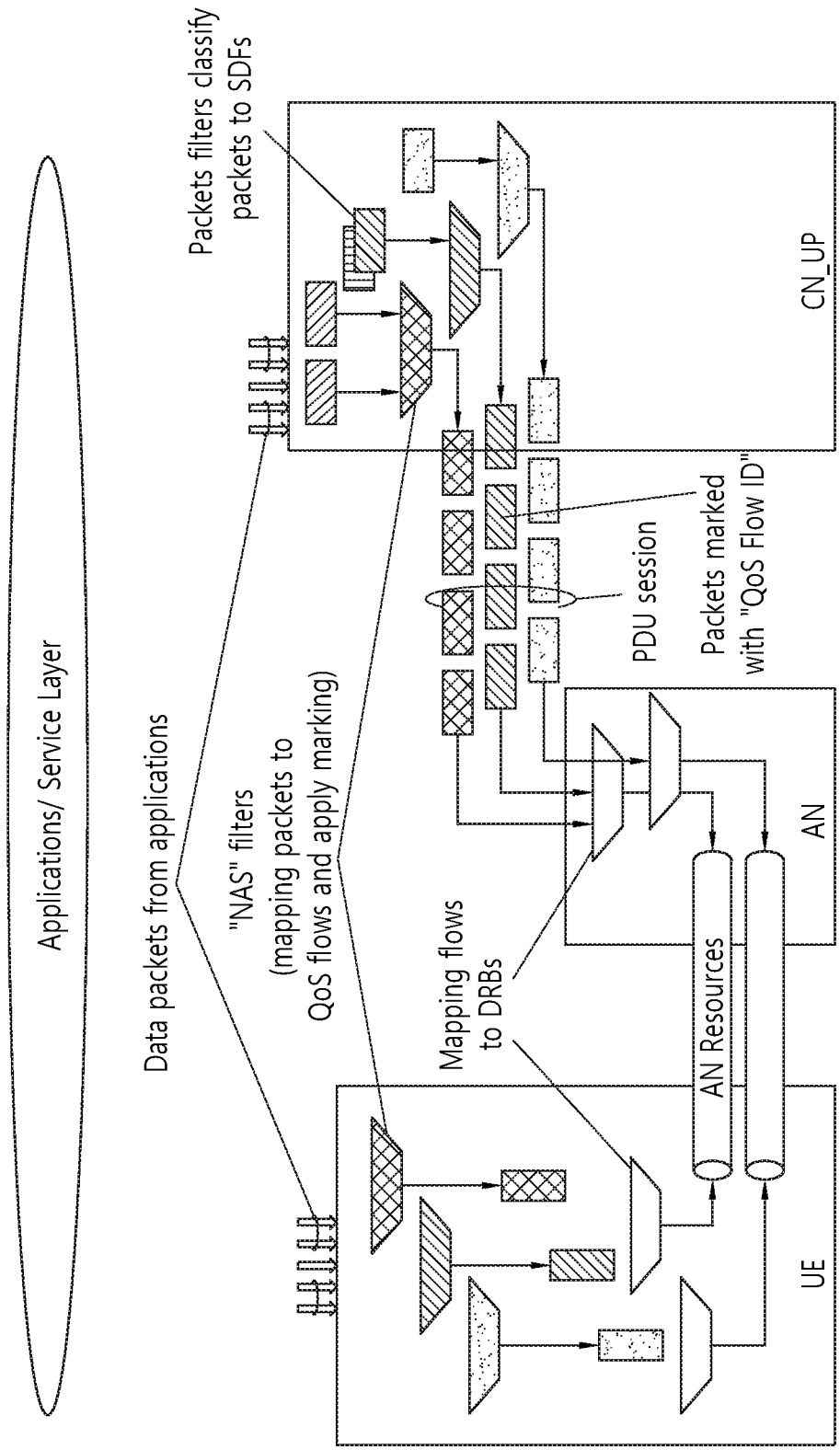
FIG. 8 illustrates a principle of classifying and marking user plane traffic and mapping a QoS flow to an AN resource.

FIG. 8 illustrates a principle of classifying and marking user plane traffic and mapping a QoS flow to an AN resource.

Referring to FIG. 8, DL incoming data packets are classified according to a corresponding SDF precedence (without being initialized by additional N4 signaling) on the basis of an SDF template. A CN may use a QFI to transfer a classification of user plane traffic belonging to a QoS flow through N3 (and N9). An AN may bind the QoS flow to an AN resource (i.e., in case of 3GPP RAN, a data radio bearer). There is no strict 1:1 relation between the QoS flow and the AN resource. The AN may configure an AN resource required to map the QoS flow to a DRB, so that a UE receives the QFI and reflective QoS is applied.

In UL, the UE may evaluate a UL packet until a matching QoS rule is found by increasing an order for a packet filter of a QoS rule on the basis of a precedence value of the QoS rule. Herein, the matching QoS rule implies a QoS rule when a packet filter corresponding to the QoS rule is matched to a UL packet. The UE uses a QFI of a corresponding matching QoS rule to bind the UL packet to a QoS flow. The UE may bind the QoS flow to an AN resource.

If there is no matching QoS rule and if a default QoS rule includes one or more UL packet filters, the UE may discard transmission of a UL data packet.

The following characteristics may be applied to DL traffic processing.

A UPF may map user plane traffic to a QoS flow on the basis of an SDF template.

The UPF may perform session-AMBR enforcement, and may perform PDU counting for charging.

The UPF transmits PDUs of a PDU session in a single tunnel on 5GC and (R)AN. The UPF may include a QFI in an encapsulation header. The UPF may include an indicator for activating reflective QoS in the encapsulation header.

The UPF performs transmission level packet marking in DL. That is, the UPF sets a DiffServ code point in an external IP header. The transmission level packet marking may be based on 5QI and ARP of a corresponding QoS flow.

The (R)AN may map a PDU from a QoS flow to an access-specific resource in consideration of an N3 tunnel related to a DL packet on the basis of a QFI and a related 5G QoS feature and parameter. The packet filter is not used to bind the QoS flow to the access-specific resource in the (R)AN.

When reflective QoS is applied, the UE may generate a new derived QoS rule. A packet filter in the derived QoS rule may be derived from a DL packet (i.e., from a header of the DL packet), and a QFI of the QoS rule may be set according to the QFI of the DL packet.

In addition, the following characteristics may be applied to process UL traffic.

A UE may use a stored QoS rule to determine mapping between UL user plane traffic and a QoS flow. The UE may transmit a UL PDU by using an access specific resource corresponding to a UL PDU for the QoS flow based on the mapping provided by an RAN.

The (R)AN may transmit a PDU to a UPF through the N3 tunnel. When a UL packet is transferred from the (R)AN to a CN, the (R)AN may determine a QFI value included in an encapsulation header of a UL PDU and select the N3 tunnel.

The (R)AN may perform transmission level packet marking in UL. The transmission level packet marking may be based on an ARP and 5QI of a related QoS flow.

The UPF may verify whether the QFI in the UL PDU is provided to the UE or is adjusted according to a QoS rule implicitly obtained by the UE.

The UPF may perform session-AMBR enforcement, and may perform PDU counting for charging.

In case of a UL classifier PDU session, UL and DL session-AMBR may be enforced in a UPF supporting UL classifier functionality. In addition, the DL session-AMBR may be enforced individually in all UPFs which terminate an N6 interface. That is, the DL session-AMBR may be enforced without an interaction between the UPFs.

In case of a multi-homed PDU session, the UL and DL session-AMBR may be enforced in a UPF supporting branching point functionality. In addition, the DL session-AMBR may be enforced individually in all UPFs which terminate an N6 interface. That is, the DL session-AMBR may be enforced without an interaction between the UPFs.

In order to decrease unnecessary transmission of traffic discarded by a UPF which performs UL classifier functionality/UL/branching point functionality due to an amount of DL traffic for a PDU session exceeding the DL session-AMBR, the DL session-AMBR may be enforced in all UPFs which terminate the N6 interface.

The (R)AN may enforce a maximum bitrate (UE-AMBR) limit in UL and DL for each UE with respect to a non-BGR QoS flow. If the UE receives a session-AMBR, the UE may perform a UL speed limit for a PDU session on the basis of non-GBR traffic using the session-AMBR.

The enforcing of the speed limit for each PDU session may be applied to a flow in which a specific flow bitrate is not necessarily guaranteed. An MBR per SDF is essential in the GBR QoS flow, but is optional in the non-GBR QoS flow. The MBR may be enforced in the UPF.

A QoS control for an unstructured PDU may be performed at a PDU session level. If a PDU session is established to transmit the unstructured PDU, the SMF may provide the UPF and the UE with a QFI to be applied to all packets of the PDU session.

Meanwhile, QoS for UL may be implemented by reflecting QoS for DL. That is, the UE may be configured to transmit UL data with the same level as a QoS level for received DL data. Such a mechanism for managing and guaranteeing QoS is called a reflective QoS scheme.

There are two methods of controlling reflective QoS (RQ) defined currently. The methods include a method in which a user plane is used to perform transmission by setting a reflective QoS indicator (RQI) in a N3 tunnel header and a method in which a control plane is used to transmit a NAS signal to a UE.

In order to apply the RQ, the UE needs to know a QoS flow ID (QFI) of a DL packet. In this case, an additional resource shall be used in order for the RAN to transmit the QFI. Therefore, since a radio resource is consumed when the QFI is always transmitted, the QFI may be transmitted only for a QoS flow to which the RQ is applied, and when transmitting a packet corresponding to the QoS flow to which the reflective QoS is applied, a BS may know in advance a specific QoS flow to which reflective QoS is to be applied, and may transmit the packet by inserting the QFI into a service data adaptation protocol (SDAP) header.

Meanwhile, when the RQ is configured by using a user plane, a packet is transferred from the UPF to the BS by setting an RQI in an N3 header. Therefore, upon receiving the packet in which the RQI is set, the BS may perform transmitting by inserting the QFI into an SDAP header.

However, when the RQ is configured by using a control plane, the BS shall perform transmission by inserting the QFI into the SDAP header of all packets corresponding to a specific QFI indicated by a session management function, instead of performing transmission on a packet basis, which causes a problem in that a radio resource of the BS is wasted.

DISCLOSURE OF THE PRESENT SPECIFICATION

To solve the aforementioned problem, the present specification proposes a reflective QoS method performed by a BS. Although the present disclosure is described as a solution for a case of using a control plane to configure RQ, the present disclosure is also applicable not only to a case of using the control plane but also to a case of using a user plane to configure the RQ.

I. First Disclosure: A Case of Using User Plane

In case of using a user plane to perform RQ, a network may perform transmission by setting an RQI in a packet to which the RQ is to be applied. Upon receiving the packet in which the RQI is set, a UE may generate a derived QoS rule to be applied to UL on the basis of a source/destination address, port number, and/or protocol information or the like included in the packet. The QoS rule may be used to transmit UL data. The UE may drive the timer to determine a lifetime of the QoS rule.

The UE shall perform the aforementioned operations whenever the packets in which the RQI is set are received. Therefore, even if the UE receives a packet including the same source/destination address, port number, and/or protocol information and the same QFI, the UE shall update a QoS rule for the packet and shall reset the timer. That is, since the UE shall perform an operation of updating the QoS rule and resetting the timer whenever the packet in which the RQI is set is received, battery consumption of the UE may be increased and performance of the UE may be affected.

I-1. First Example of First Disclosure

In order to solve such a problem, a first example of a first disclosure proposes that an RQI is set with a specific interval without having to set the RQI whenever a user plane function (UPF) transmits a packet.

A derived QoS rule generated by a UE is maintained according to a time indicated by a timer. Therefore, a network (a BS or a network node) may transmit a packet, in which the RQI is set, one time before the timer of the UE expires without having to set the RQI whenever the same packet is transmitted to the UE, thereby having the same effect of setting the RQI whenever the same packet is transmitted to the UE. However, in the above case, the timer of the UE may expire when a packet transmitted by the BS is dropped and this is not recognized.

In order to prevent the expiry of the timer on the basis of the drop of the packet, the packet may be transmitted by decreasing a period of setting the RQI to the packet or by setting the RQI in consecutive packets. If the RQI is set in the consecutive packets, even if one packet is dropped, the timer may be reset by a next packet.

I-2. Second Example of First Disclosure

A second example of the first disclosure proposes that, even if a UPF transmits a packet to a BS by setting an RQI for each packet to be transmitted, the BS performs transmission by selectively setting an RQI and/or a QFI within an SDAP header. That is, even if the RQI is set in the packet received from the UPF, the BS may perform transmission to the UE without having to set the QFI in the packet.

According to an embodiment, in order to prevent the expiry of the timer of the UE, the BS may perform transmission by setting an RQI and/or a QFI in at least one packet before the timer expires. That is, the BS may perform transmission by setting the RQI and/or the QFI in at least one packet during one cycle in which the timer of the UE is driven. In this case, the BS may transmit at least one packet in which the RQI and/or the QFI are set with the same transmission period.

As such, a reason of proposing that the BS determines whether to transmit the RQI and/or the QFI in the second example of the first disclosure is that the BS may autonomously determine whether data transmitted to a UE is successfully transmitted. Therefore, effectiveness may be increased when the UE performs reflective QoS.

In order for the BS to determine whether the RQI and/or the QFI are set, the BS and/or the UPF need to know a timer value of the timer used by the UE. According to an embodiment, the time value of the timer used by the UE may be transmitted to the BS and/or the UPF in an PDU session establishment procedure. According to another embodiment, the time value of the timer used in the UE may be pre-configured.

According to an embodiment, in order to decrease an overhead of monitoring the timer, the BS and/or the UPF may transmit the RQI with a specific interval (e.g., 1 out of 10 times) without using the timer.

If the timer used by the UE expires, the UE may delete a QoS rule applied previously, and may perform reflective QoS by applying a pre-configured default value.

II. Second Disclosure: A Case of Using Control Plane

In case of using a control plane function, when an SMF transmits a NAS signal to a UE, the SMF may inform the UE that RQ is to be applied to a specific QFI. For example, the SMF may use an RQA when informing the UE that the RQ is to be applied to the specific QFI.

In this case, the SMF may also inform a BS of a specific QFI to which the RQ is to be applied. The BS shall perform transmission by setting the RQI and/or the QFI in an SDAP header in all packets corresponding to the QFI informed by the SMF. However, since a plurality of IP flows may be included in a QoS flow corresponding to the QFI, the BS shall perform transmission always by setting the RQI and/or the QFI, which results in waste of a network resource. In addition, in the same manner as in a case of using the UPF, the UE shall be subjected to a process of generating a derived QoS rule and resetting a timer whenever the UE receives packets in which the QFI informed by the SMF is set, thereby increasing complexity.

As a method of solving this problem, in the same manner as in the first disclosure, the second disclosure of the present specification proposes an improved method in which a BS performs transmission to a UE by including a QFI into an SDAP header only for packets in which an RQI or an RQA is included, when a UPF transmits a packet including an N3 header in which the RQI and or the RQA is set.

In this case, the SMF does not have to inform the BS of the QFI requiring reflective QoS in a PDU session establishment procedure. Instead, the SMF shall inform the UPF of a QFI corresponding to an N3 header for which the RQI/RQA is to be set.

The UPF may perform transmission to the UE by setting an RQI/RQA in a packet with a specific interval in the same manner as in the method used in a user plane. That is, even if the control plane is used, according to an embodiment, the UPF may perform transmission by decreasing a period of setting the RQI in the packet or by setting the RQI in consecutive packets. In addition, according to another embodiment, even if the UPF performs transmission to the BS by setting the RQI for each packet, the BS may perform transmission to the UE by selectively setting the RQI and/or the QFI in the SDAP header. That is, even if the RQI is set in packets received from the UPF, the BS may perform transmission to the UE by selectively setting the QFI and/or the RQI. In order to prevent the expiry of the timer of the UE, the BS may perform transmission to the UE by setting the RQI and/or the QFI in at least one packet before the timer of the UE expires.

The UE may update the QoS rule and reset the timer only upon receiving a packet in which QFI and/or RQI are set. Accordingly, there is an advantage in that an operation of the UE is significantly decreased.

The SMF may use a PDU session establishment procedure or a PDU session modification procedure to transmit information on a timer used in reflective QoS to a radio access network (RAN) (e.g., BS).

If the timer used in the UE expires, the UE may delete the QoS rule previously applied, and may perform the reflective QoS by applying a pre-configured default value.

Figure 9A:
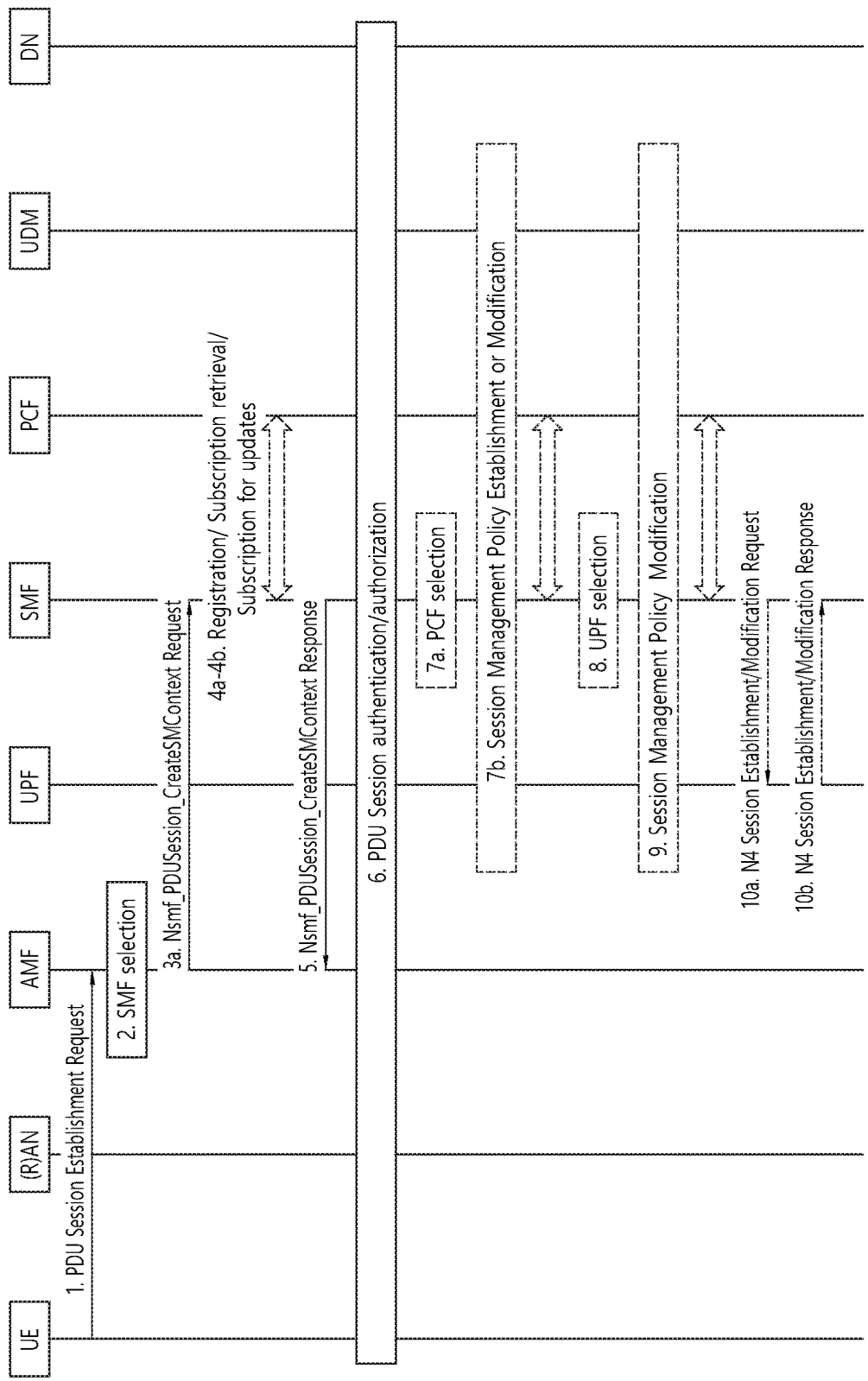
FIG. 9a and FIG. 9b illustrate a process of transmitting information on a timer used in reflective QoS to an RAN in a PDU session establishment procedure.
Figure 9B:
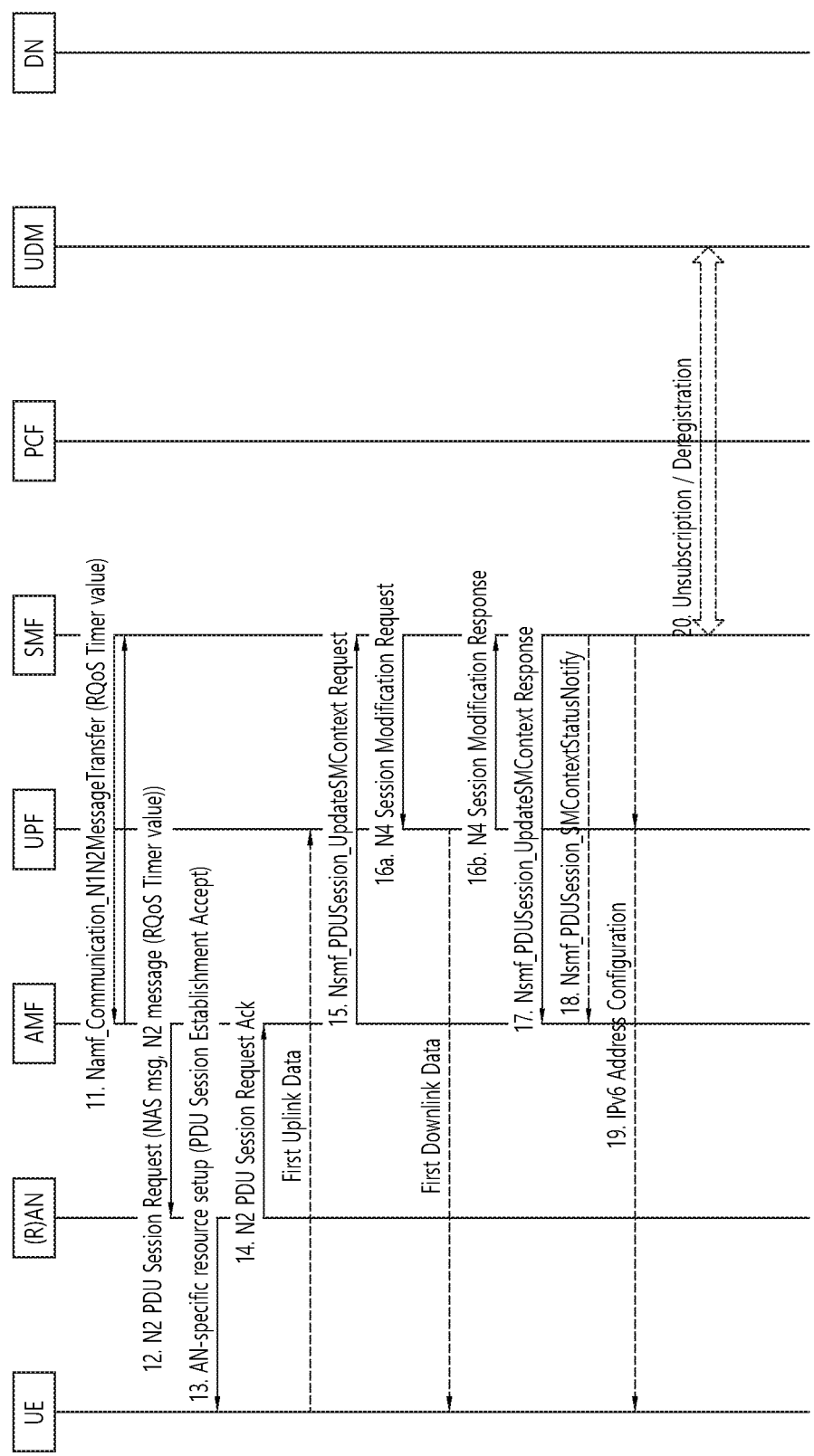

FIG. 9a and FIG. 9b illustrate a process of transmitting information on a timer used in reflective QoS to an RAN in a PDU session establishment procedure.

Referring to FIG. 9a and FIG. 9b, if information on a timer used in reflective QoS is transmitted in a PDU session establishment procedure, an SMF may transmit information on a reflective QoS timer used in a corresponding PDU session to an RAN (i.e., BS) while transmitting an N2 message to the RAN (i.e., BS) (step 11). The RAN (i.e., BS) may know an expiration time of the reflective QoS timer driven by a UE expires by using the received information on the reflective QoS timer. The RAN (i.e., BS) may transmit data by including an RQI and/or a QFI before the expiry of the QoS timer driven by the UE, and the UE may maintain the reflective QoS timer by receiving the RQI and/or the QFI.

According to an embodiment, if the SMF does not transmit the information on the reflective QoS timer to the RAN (i.e., BS), the RAN (i.e., BS) may use a pre-configured value as the information on the timer.

According to an embodiment, the SMF may determine whether to transmit the information on the reflective QoS timer on the basis of whether the UE roams. For example, if the UE is a non-roaming UE and determines to use the value pre-configured in the RAN (i.e., BS) as the information on the timer, the SMF does not have to transmit the information on the reflective QoS timer to the RAN (i.e., BS). Otherwise, if the UE is a roaming UE, since a timer value pre-configured in the UE may be different from the value pre-configured in the RAN (i.e., BS), the SMF may transmit the information on the reflective QoS timer to the UE and the RAN (i.e., BS) in the PDU session establishment procedure.

Figure 10A:
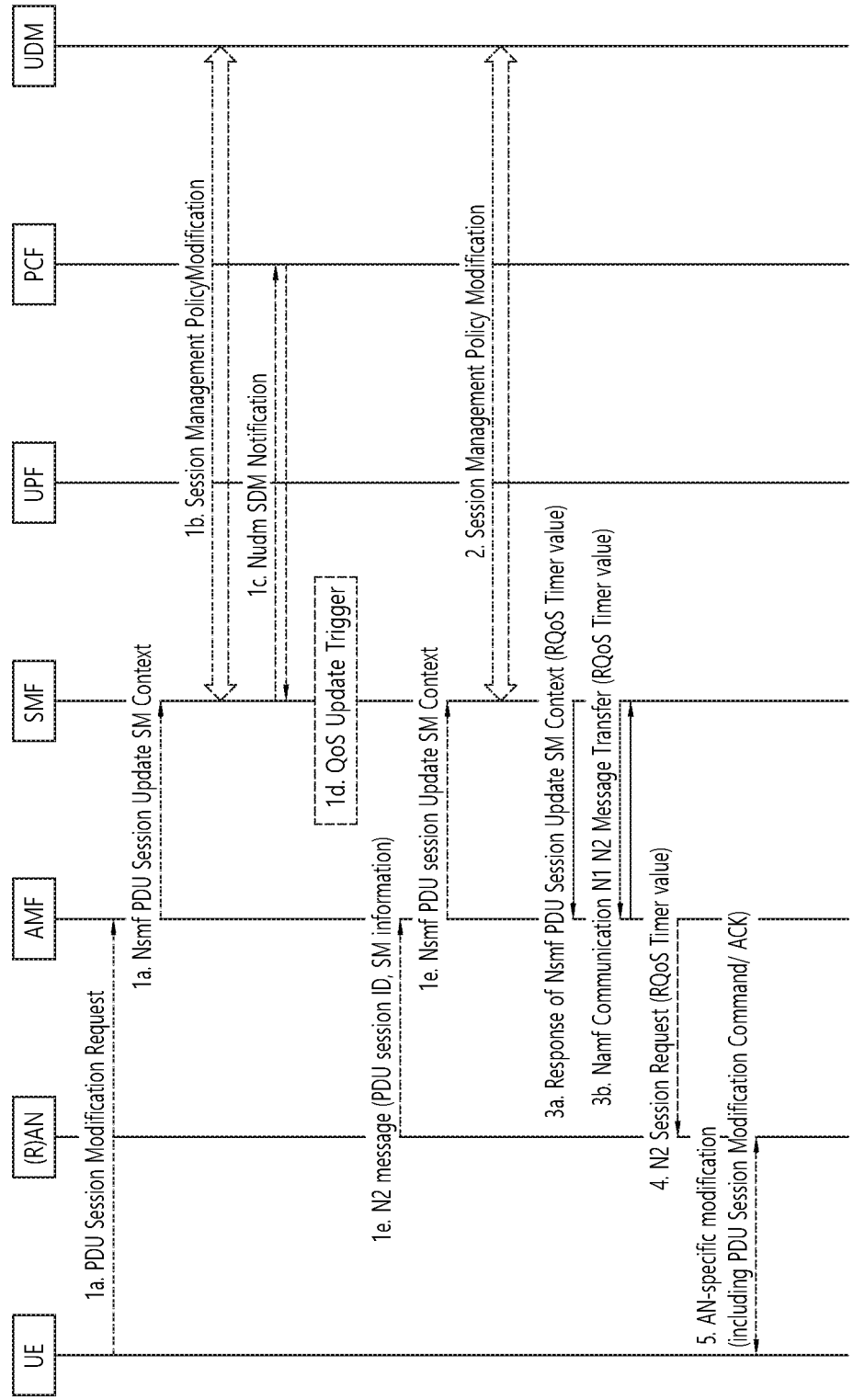
FIG. 10a and FIG. 10b illustrate a process of transmitting information on a timer used in reflective QoS to an RAN in a PDU session modification procedure.
Figure 10B:
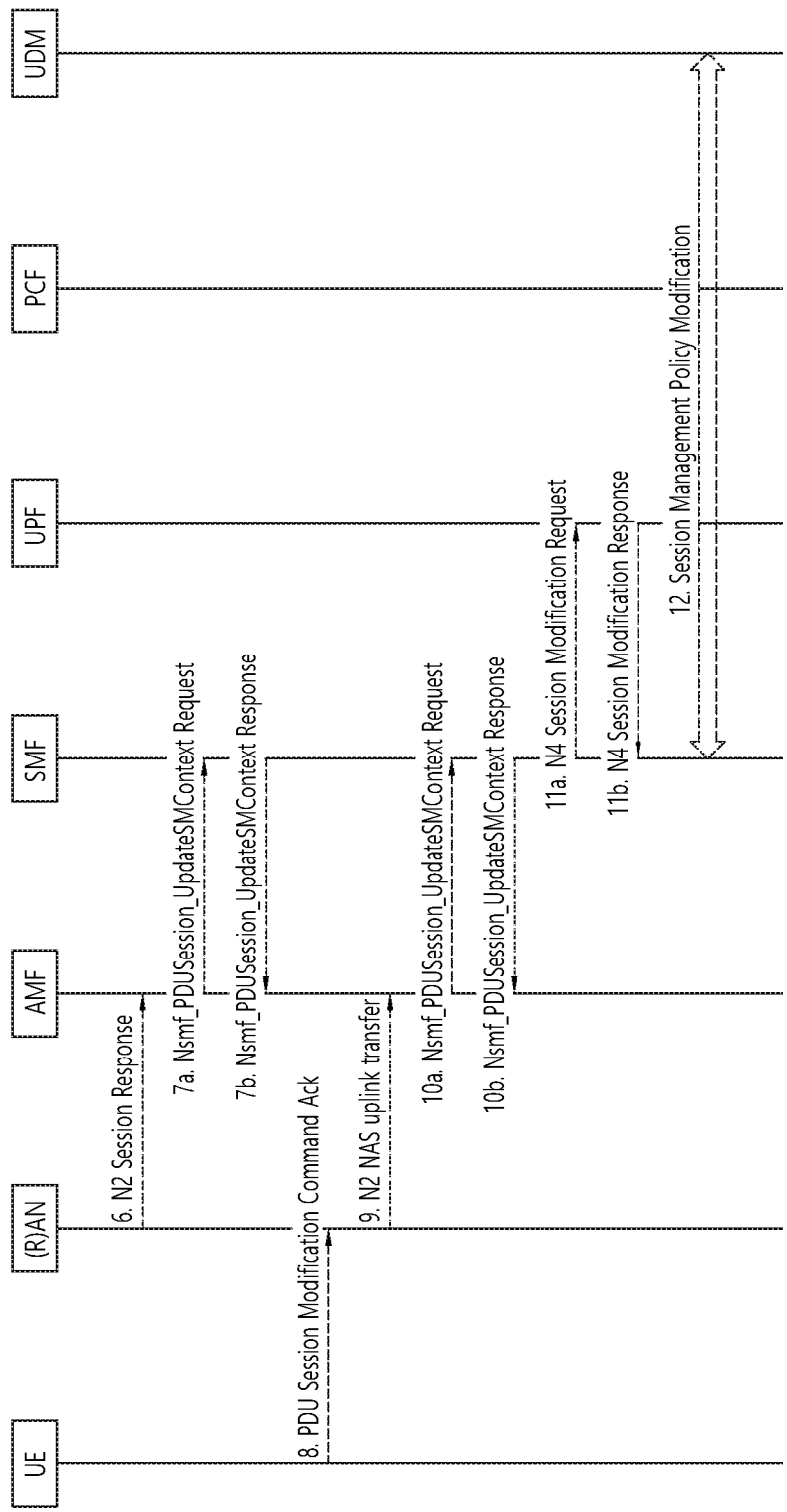

FIG. 10a and FIG. 10b illustrate a process of transmitting information on a timer used in reflective QoS to an RAN in a PDU session modification procedure.

Referring to FIG. 10a and FIG. 10b, an SMF may use the step 3a or 3b of FIG. 9a to transmit information on a reflective QoS timer to an RAN (i.e., BS). A method of transmitting the information on the reflective QoS timer in a PDU session modification procedure may be similar to a method of transmitting the information in the PDU session establishment procedure of FIG. 9a and FIG. 9b except that the step 3a or 3b of FIG. 10a is used. Therefore, undescribed parts in FIG. 10a and FIG. 10b will refer to the method of FIG. 9a and FIG. 9b.

According to an embodiment, if the reflective QoS timer information received in the PDU session modification procedure is different from previously used information (e.g., timer information received in a PDU session establishment procedure or a previous PDU session modification procedure), the UE and the RAN shall perform the reflective QoS by using newly received information on the reflective QoS timer.

According to an embodiment, if the UE has already driven a timer by using the previously received information on the reflective QoS timer, the UE may operate differently according to updated information on the reflective QoS timer.

For example, if the updated information on the reflective QoS timer indicates a value smaller than a timer value in use, the UE directly uses a timer in use. However, if the timer in use is reset or a new timer is driven, the reflective QoS may be performed by using the updated reflective QoS timer information.

On the other hand, if the updated reflective QoS timer information is greater than the timer value in use, timers in use may be all reset, and the updated reflective QoS timer information may be used to restart the timer.

Unlike this, regardless of whether the updated reflective QoS timer information is greater than or less than the timer value in use, the UE directly uses the timers in use. However, if the timer in use is reset or a new timer is driven at a later time, the updated reflective QoS timer information may be used to perform reflective QoS.

The content described up to now can be implemented in hardware. This will be described with reference to the drawing.

Figure 11:
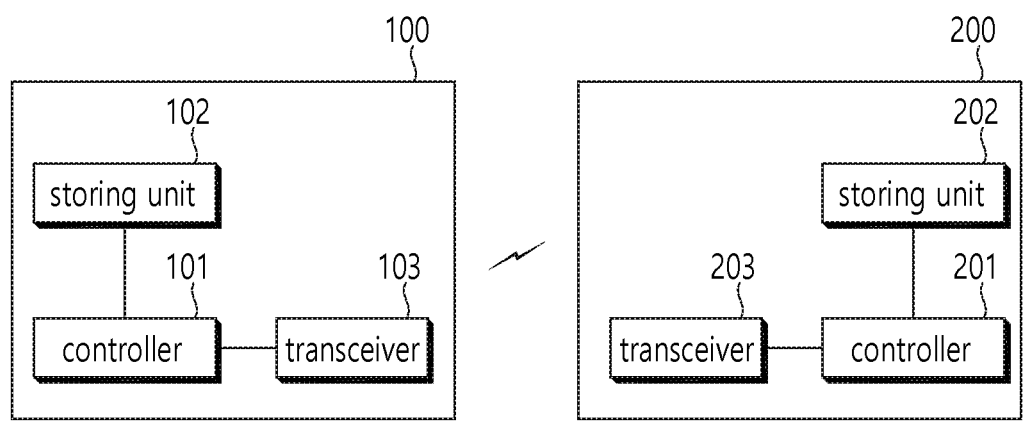
FIG. 11 is a block diagram of a UE and a network node according to an embodiment of the present disclosure.

FIG. 11 is a block diagram of a UE and a network node according to an embodiment of the present disclosure.

As shown in FIG. 11, the UE 100 includes a storing unit 101, a controller 102, and a transceiver 103. Further, the network node may be any one of an AMF, an SMF, an NEF, and an AF. The network node includes a storing unit 511, a controller 512, and a transceiver 513.

The storing units store the aforementioned method.

The controllers control the storing units and the transceivers. More specifically, the controllers respectively execute the methods stored in the storing units. Further, the controllers transmit the aforementioned signals via the transceivers.

Although exemplary embodiments of the present disclosure have been described above, the scope of the present disclosure is not limited to the specific embodiments and the present disclosure may be modified, changed, or improved in various ways within the scope of the present disclosure and the category of the claims.

What is claimed is:

1. A method of managing uplink quality of service (QoS) by a base station, the method comprising:
   receiving a traffic flow from a user plane function (UPF), wherein a reflective QoS indication (RQI) is set in all packets within the traffic flow received from the UPF;
   receiving information regarding a timer driven by a terminal during a packet data unit (PDU) session establishment procedure or a PDU session modification procedure;
   determining whether the timer driven by the terminal in relation to reflective QoS has expired, based on the information regarding the timer; and
   transmitting a plurality of packets within the traffic flow to which the reflective QoS is applied, without setting at least one of the RQI and a QoS flow ID (QFI) during the driving of the timer of the terminal.

2. The method of claim 1, wherein the traffic flow comprising packets in which the RQI is set by the UPF is indicated by a session management function (SMF).

3. The method of claim 1, wherein a value of the timer is configured on a PDU session basis.

4. The method of claim 1, wherein the timer is driven for every traffic flow.

5. The method of claim 1, further comprising determining whether information on the timer driven by the terminal in relation to the reflective QoS has been received, wherein if the information on the timer has not been received, whether the timer has expired is determined based on a pre-configured value.

6. The method of claim 1, further comprising determining whether information on the timer driven by the terminal in relation to the reflective QoS has been received, based on that the terminal roams.

7. The method of claim 6, wherein the information on the timer is received from a visited network node or a home network node based on that the terminal is in a roaming state.

8. The method of claim 1, further comprising:
   setting at least one of the RQI and the QFI for a packet within the traffic flow; and
   transmitting the set packet, before the timer driven by the terminal expires,
   wherein an expiration for the timer is extended based on the set packet.

9. A base station for managing uplink quality of service (QoS), the base station comprising:
   a transceiver; and
   a processor configured to control the transceiver,
   wherein the processor is further configured to:
   receive a traffic flow from a user plane function (UPF), wherein a reflective QoS indication (ROI) is set in all packets within the traffic flow received from the UPF;
   receive information regarding a timer driven by a terminal during a packet data unit (PDU) session establishment procedure or a PDU session modification procedure;
   determine whether the timer driven by the terminal in relation to reflective QoS has expired, based on the information regarding the timer; and
   transmit a plurality of packets within the traffic flow to which the reflective QoS is applied, without setting at least one of the RQI and a QoS flow ID (QFI) during the driving of the timer of the terminal.

10. The base station of claim 9, wherein the traffic flow comprising packets in which the RQI is set by the UPF is indicated by a session management function (SMF).

11. The base station of claim 9, wherein information on the timer driven by the terminal is received during a packet data unit (PDU) session establishment procedure or a PDU session modification procedure.

12. The base station of claim 9, wherein a value of the timer is configured on a PDU session basis.

13. The base station of claim 9, wherein the timer is driven for every traffic flow.

14. The base station of claim 9,
   wherein the processor is configured to determine whether information on the timer driven by the terminal in relation to the reflective QoS has been received,
   wherein if the information on the timer has not been received, whether the timer has expired is determined based on a pre-configured value.

15. The base station of claim 9, wherein the processor is configured to determine whether information on the timer driven by the terminal in relation to the reflective QoS has been received, based on that the terminal roams.

16. The base station of claim 15, wherein the information on the timer is received from a visited network node or a home network node, based on that the terminal is in a roaming state.

17. The base station of claim 9, wherein the processor is configured to:
- set at least one of the RQI and the QFI for a packet within the traffic flow and transmit the set packet, before the timer driven by the terminal expires,
- wherein an expiration for the timer is extended based on the set packet.

* * * * *